US012786731B2

(12) United States Patent
Kakinada et al.

(10) Patent No.: US 12,786,731 B2
(45) Date of Patent: Nov. 3, 2026

(54) METHODS AND APPARATUS FOR WIRELESS SPECTRUM ALLOCATION ACROSS MULTIPLE ENTITIES

(71) Applicant: CHARTER COMMUNICATIONS OPERATING, LLC, St. Louis, MO (US)

(72) Inventors: Umamaheswar Kakinada, Carpentersville, IL (US); Hossam H. Hmimy, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 317 days.

(21) Appl. No.: 18/373,860

(22) Filed: Sep. 27, 2023

(65) Prior Publication Data

US 2024/0022914 A1 Jan. 18, 2024

Related U.S. Application Data

(60) Division of application No. 17/536,960, filed on Nov. 29, 2021, now Pat. No. 11,778,480, which is a (Continued)

(51) Int. Cl.

| | |
|---|---|
| ***H04W 16/14*** | (2009.01) |
| ***H04W 72/0453*** | (2023.01) |
| ***H04W 72/56*** | (2023.01) |

(52) U.S. Cl.

CPC ....... *H04W 16/14* (2013.01); *H04W 72/0453* (2013.01); *H04W 72/56* (2023.01)

(58) Field of Classification Search

CPC ... H04W 16/14; H04W 72/10; H04W 72/042; H04W 72/044; H04W 72/085;

(Continued)

(56) References Cited

U.S. PATENT DOCUMENTS

| | | | |
|---|---|---|---|
| 5,991,308 | A | 11/1999 | Fuhrmann et al. |
| 5,995,499 | A | 11/1999 | Hottinen et al. |

(Continued)

FOREIGN PATENT DOCUMENTS

| | | | |
|---|---|---|---|
| EP | 2294860 | B1 | 4/2017 |
| EP | 3741168 | A1 | 11/2020 |

(Continued)

OTHER PUBLICATIONS

Kulacz L., et al., "Coordinated Spectrum Allocation and Co existence Management in CBRS-SAS Wireless Networks." IEEE Access, vol. 07, pp. 139294-139316. (Year: 2019).

(Continued)

*Primary Examiner* — Peter Chen
(74) *Attorney, Agent, or Firm* — Patent Beach PC

(57) ABSTRACT

Methods and apparatus for providing quasi-licensed spectrum allocation among two or more entities within a prescribed coverage or operational area. In one embodiment, the quasi-licensed spectrum utilizes 3.5 GHz CBRS (Citizens Broadband Radio Service) spectrum allocated between two or more Federal or commercial SASs (Spectrum Access Systems), for use by various service provider entities such as a managed content delivery network that includes one or more wireless access nodes (e.g., CBSDs). In one variant, each of two or more SAS entities generate both proposed allocations for themselves and other participating SAS entities with respect to available GAA spectrum, and differences between the proposed allocations are reconciled and condensed using a dynamic, iterative process to converge on a final allocation which fits the available GAA spectrum and which equitably distributes the spectrum between the participating SAS entities.

20 Claims, 19 Drawing Sheets

Related U.S. Application Data continuation of application No. 16/557,498, filed on Aug. 30, 2019, now Pat. No. 11,190,948, which is a continuation of application No. 15/902,833, filed on Feb. 22, 2018, now Pat. No. 10,405,192.

(60) Provisional application No. 62/617,976, filed on Jan. 16, 2018, provisional application No. 62/617,549, filed on Jan. 15, 2018.

(58) Field of Classification Search
CPC .......... H04W 72/0453; H04W 72/0446; H04L 5/0007; H04L 27/00; H04L 27/26; H04L 27/2602; H04L 65/1069; H04L 12/66
See application file for complete search history.

(56) References Cited

U.S. PATENT DOCUMENTS

| | | | |
|---|---|---|---|
| 6,154,648 | A | 11/2000 | Comer |
| 6,192,038 | B1 | 2/2001 | Wallerius et al. |
| 6,356,560 | B1 | 3/2002 | Venters et al. |
| 6,771,953 | B1 | 8/2004 | Chow et al. |
| 6,782,262 | B1 | 8/2004 | Lundborg |
| 7,573,819 | B2 | 8/2009 | Krzanowski et al. |
| 8,189,465 | B1 | 5/2012 | Pawar et al. |
| 8,218,422 | B2 | 7/2012 | Venturino et al. |
| RE43,760 | E | 10/2012 | Abel et al. |
| 8,958,810 | B2 * | 2/2015 | Buddhikot ............ H04W 72/51 455/452.2 |
| 8,997,136 | B2 | 3/2015 | Brooks et al. |
| 9,166,891 | B2 | 10/2015 | Hu et al. |
| 9,258,809 | B2 | 2/2016 | Liao et al. |
| 9,386,496 | B2 | 7/2016 | Gupta et al. |
| 9,413,651 | B2 | 8/2016 | Tsym et al. |
| 9,473,957 | B2 | 10/2016 | Wellington |
| 9,526,056 | B2 | 12/2016 | Tomici et al. |
| 9,564,932 | B1 | 2/2017 | Pack et al. |
| 9,591,491 | B2 | 3/2017 | Tapia et al. |
| 9,612,816 | B2 | 4/2017 | Choi et al. |
| 9,654,149 | B2 | 5/2017 | Piipponen et al. |
| 9,699,663 | B1 | 7/2017 | Jovancevic |
| 9,730,135 | B1 | 8/2017 | Rahman |
| 9,730,143 | B2 | 8/2017 | Gormley et al. |
| 9,769,692 | B2 | 9/2017 | Freda et al. |
| 9,807,778 | B2 | 10/2017 | Ma et al. |
| 9,813,148 | B2 | 11/2017 | Syed et al. |
| 9,887,864 | B1 | 2/2018 | Han et al. |
| 10,003,548 | B2 | 6/2018 | Lee et al. |
| 10,098,568 | B2 | 10/2018 | Gazdzinski |
| 10,135,730 | B2 | 11/2018 | Chou |
| 10,271,351 | B1 | 4/2019 | Wang |
| 10,340,976 | B2 | 7/2019 | Kakinada et al. |
| 10,405,192 | B2 | 9/2019 | Kakinada et al. |
| 10,419,943 | B1 | 9/2019 | Wong et al. |
| 10,484,876 | B2 | 11/2019 | Shah et al. |
| 10,492,204 | B2 | 11/2019 | Kakinada et al. |
| 10,499,409 | B2 | 12/2019 | Shattil |
| 10,506,456 | B2 | 12/2019 | Lou et al. |
| 10,531,309 | B1 | 1/2020 | Li et al. |
| 10,536,859 | B2 | 1/2020 | Gunasekara et al. |
| 10,624,079 | B2 | 4/2020 | Xu et al. |
| 10,680,883 | B2 | 6/2020 | Hall et al. |
| 10,750,462 | B2 | 8/2020 | Kadambar et al. |
| 10,805,562 | B2 | 10/2020 | Nakamura et al. |
| 10,945,250 | B2 | 3/2021 | Kwon et al. |
| 11,026,205 | B2 | 6/2021 | Hmimy et al. |
| 11,190,861 | B2 | 11/2021 | Bali |
| 11,219,026 | B2 | 1/2022 | Kakinada et al. |
| 11,363,466 | B2 | 6/2022 | Khalid et al. |
| 11,432,284 | B2 | 8/2022 | Hmimy et al. |
| 11,438,771 | B2 | 9/2022 | Syed et al. |
| 11,457,485 | B2 | 9/2022 | Khalid et al. |
| 11,483,715 | B2 | 10/2022 | Sevindik et al. |
| 11,523,306 | B1 | 12/2022 | Chu et al. |
| 12,009,885 | B2 | 6/2024 | Murakami |
| 12,231,248 | B2 | 2/2025 | Fehrenbach et al. |
| 2002/0126748 | A1 | 9/2002 | Rafie et al. |
| 2004/0001021 | A1 | 1/2004 | Choo et al. |
| 2004/0196834 | A1 | 10/2004 | Ofek et al. |
| 2006/0188004 | A1 | 8/2006 | Kizu et al. |
| 2008/0097913 | A1 | 4/2008 | Dicks et al. |
| 2008/0220786 | A1 | 9/2008 | Beacham |
| 2008/0220788 | A1 | 9/2008 | Stanwood et al. |
| 2009/0034443 | A1 | 2/2009 | Walker et al. |
| 2009/0129273 | A1 | 5/2009 | Zou |
| 2009/0170472 | A1 | 7/2009 | Chapin et al. |
| 2009/0253438 | A1 | 10/2009 | Chater-Lea et al. |
| 2010/0035611 | A1 | 2/2010 | Montojo et al. |
| 2010/0094956 | A1 | 4/2010 | Zuckerman et al. |
| 2010/0128608 | A1 | 5/2010 | Zou et al. |
| 2010/0234042 | A1 | 9/2010 | Chan et al. |
| 2010/0309806 | A1 | 12/2010 | Wu et al. |
| 2011/0014924 | A1 | 1/2011 | Hwang et al. |
| 2011/0292970 | A1 | 12/2011 | Lansford et al. |
| 2012/0188877 | A1 | 7/2012 | Chin et al. |
| 2013/0122903 | A1 | 5/2013 | Farnsworth et al. |
| 2013/0182602 | A1 | 7/2013 | Lee et al. |
| 2013/0279376 | A1 | 10/2013 | Ahmadi |
| 2013/0281092 | A1 | 10/2013 | Gassend |
| 2013/0288675 | A1 | 10/2013 | Gassend |
| 2013/0303145 | A1 | 11/2013 | Harrang et al. |
| 2013/0315124 | A1 | 11/2013 | Rapaport et al. |
| 2013/0336175 | A1 | 12/2013 | Um et al. |
| 2014/0106672 | A1 | 4/2014 | Jeon et al. |
| 2014/0194068 | A1 | 7/2014 | Coppage et al. |
| 2014/0199991 | A1 | 7/2014 | Mukherjee et al. |
| 2014/0241187 | A1 | 8/2014 | Barkay et al. |
| 2014/0269526 | A1 | 9/2014 | Mitola, III |
| 2014/0308986 | A1 | 10/2014 | Yang et al. |
| 2015/0055623 | A1 | 2/2015 | Li et al. |
| 2015/0071239 | A1 | 3/2015 | Zhang et al. |
| 2015/0133173 | A1 | 5/2015 | Edge et al. |
| 2015/0181546 | A1 | 6/2015 | Freda et al. |
| 2015/0189609 | A1 | 7/2015 | Zhang et al. |
| 2015/0208262 | A1 | 7/2015 | Siomina |
| 2015/0280847 | A1 | 10/2015 | Somasundaram et al. |
| 2015/0304856 | A1 | 10/2015 | Garcia et al. |
| 2015/0334664 | A1 | 11/2015 | Sawai et al. |
| 2015/0341753 | A1 | 11/2015 | Chen et al. |
| 2015/0358968 | A1 | 12/2015 | Malladi et al. |
| 2016/0007147 | A1 | 1/2016 | Zhang et al. |
| 2016/0073259 | A1 | 3/2016 | Lee et al. |
| 2016/0127185 | A1 | 5/2016 | McAllister |
| 2016/0128001 | A1 | 5/2016 | Tsuda |
| 2016/0165066 | A1 | 6/2016 | Yang et al. |
| 2016/0182134 | A1 | 6/2016 | Kol et al. |
| 2016/0212031 | A1 | 7/2016 | Jain et al. |
| 2016/0234746 | A1 | 8/2016 | Gopal et al. |
| 2016/0249350 | A1 | 8/2016 | Koutsimanis et al. |
| 2016/0269978 | A1 | 9/2016 | Bashar et al. |
| 2016/0330743 | A1 | 11/2016 | Das et al. |
| 2016/0381600 | A1 | 12/2016 | Aksu |
| 2017/0013422 | A1 | 1/2017 | Saiwai et al. |
| 2017/0026203 | A1 | 1/2017 | Thomas et al. |
| 2017/0150523 | A1 | 5/2017 | Patel et al. |
| 2017/0155703 | A1 | 6/2017 | Hao et al. |
| 2017/0164326 | A1 | 6/2017 | Worrall |
| 2017/0188241 | A1 | 6/2017 | Mueck et al. |
| 2017/0208540 | A1 | 7/2017 | Egner et al. |
| 2017/0208560 | A1 | 7/2017 | Papa et al. |
| 2017/0237767 | A1 | 8/2017 | George et al. |
| 2017/0257750 | A1 | 9/2017 | Gunasekara et al. |
| 2017/0272955 | A1 | 9/2017 | Sadek et al. |
| 2017/0295497 | A1 | 10/2017 | Macmullan et al. |
| 2017/0295578 | A1 | 10/2017 | Khoshnevisan et al. |
| 2017/0303138 | A1 | 10/2017 | Barmettler et al. |
| 2017/0311290 | A1 | 10/2017 | Adjakple et al. |
| 2017/0318472 | A1 | 11/2017 | Yu et al. |
| 2017/0325251 | A1 | 11/2017 | Sadek |
| 2017/0359731 | A1 | 12/2017 | Soldati et al. |
| 2018/0007587 | A1 | 1/2018 | Feldman et al. |
| 2018/0035463 | A1 | 2/2018 | Mallik et al. |
| 2018/0049036 | A1 | 2/2018 | Sethi et al. |
| 2018/0063736 | A1 | 3/2018 | Sadeghi et al. |

(56) References Cited

U.S. PATENT DOCUMENTS

| | | | |
|---|---|---|---|
| 2018/0063758 | A1 | 3/2018 | Velu |
| 2018/0107577 | A1 | 4/2018 | Johnsson et al. |
| 2018/0115903 | A1 | 4/2018 | Badic et al. |
| 2018/0124613 | A1 | 5/2018 | Kang et al. |
| 2018/0132112 | A1 | 5/2018 | Khoshnevisan et al. |
| 2018/0146058 | A1 | 5/2018 | Somayazulu et al. |
| 2018/0146408 | A1 | 5/2018 | Meylan et al. |
| 2018/0167948 | A1 | 6/2018 | Egner et al. |
| 2018/0199214 | A1 | 7/2018 | Shen |
| 2018/0234403 | A1 | 8/2018 | Casella et al. |
| 2018/0235007 | A1 | 8/2018 | Gou et al. |
| 2018/0242184 | A1 | 8/2018 | Yerramalli et al. |
| 2018/0255576 | A1 | 9/2018 | Bhorkar et al. |
| 2018/0279212 | A1 | 9/2018 | Malik et al. |
| 2018/0316563 | A1 | 11/2018 | Kumar et al. |
| 2018/0323938 | A1 | 11/2018 | Takeda et al. |
| 2018/0324722 | A1 | 11/2018 | Vos et al. |
| 2018/0343567 | A1 | 11/2018 | Ashrafi |
| 2018/0352386 | A1 | 12/2018 | Gunasekara et al. |
| 2019/0021012 | A1 | 1/2019 | Beck et al. |
| 2019/0028182 | A1 | 1/2019 | Smyth et al. |
| 2019/0037480 | A1 | 1/2019 | Sun et al. |
| 2019/0037605 | A1 | 1/2019 | Agiwal et al. |
| 2019/0044614 | A1 | 2/2019 | Khoshnevisan et al. |
| 2019/0081690 | A1 | 3/2019 | Mueck et al. |
| 2019/0082447 | A1 | 3/2019 | Harsha et al. |
| 2019/0098510 | A1 | 3/2019 | Guo et al. |
| 2019/0098632 | A1 | 3/2019 | Martin et al. |
| 2019/0104551 | A1 | 4/2019 | Deenoo et al. |
| 2019/0115950 | A1 | 4/2019 | Kakinada et al. |
| 2019/0120969 | A1 | 4/2019 | Hamzeh et al. |
| 2019/0132882 | A1 | 5/2019 | Li et al. |
| 2019/0141723 | A1 | 5/2019 | Zhang et al. |
| 2019/0150182 | A1 | 5/2019 | Koorapaty et al. |
| 2019/0150190 | A1 | 5/2019 | Kim et al. |
| 2019/0159254 | A1 | 5/2019 | Garde et al. |
| 2019/0174546 | A1 | 6/2019 | Jeon et al. |
| 2019/0182895 | A1 | 6/2019 | Di Girolamo et al. |
| 2019/0222266 | A1 | 7/2019 | Cui et al. |
| 2019/0223025 | A1 | 7/2019 | Kakinada et al. |
| 2019/0223180 | A1 | 7/2019 | Fehrenbach et al. |
| 2019/0230613 | A1 | 7/2019 | Kim et al. |
| 2019/0230706 | A1 | 7/2019 | Li et al. |
| 2019/0239190 | A1 | 8/2019 | Patel et al. |
| 2019/0253878 | A1 | 8/2019 | Yu et al. |
| 2019/0254094 | A1 | 8/2019 | Babu et al. |
| 2019/0296789 | A1 | 9/2019 | Yu et al. |
| 2019/0319699 | A1 | 10/2019 | Lee et al. |
| 2019/0319814 | A1 | 10/2019 | Das |
| 2019/0320490 | A1 | 10/2019 | Liu et al. |
| 2019/0349848 | A1 | 11/2019 | Bali |
| 2019/0364565 | A1 | 11/2019 | Hmimy et al. |
| 2019/0373615 | A1 | 12/2019 | Cimpu et al. |
| 2019/0387413 | A1 | 12/2019 | Wong et al. |
| 2019/0393926 | A1 | 12/2019 | Kakinada et al. |
| 2019/0394790 | A1 | 12/2019 | Damnjanovic et al. |
| 2020/0021689 | A1 | 1/2020 | Sultana et al. |
| 2020/0025629 | A1 | 1/2020 | Zinger et al. |
| 2020/0053545 | A1 | 2/2020 | Wong et al. |
| 2020/0059795 | A1 | 2/2020 | Kakinada et al. |
| 2020/0059931 | A1 | 2/2020 | Hannan et al. |
| 2020/0068617 | A1 | 2/2020 | Yoon et al. |
| 2020/0083892 | A1 | 3/2020 | Kundu et al. |
| 2020/0084759 | A1 | 3/2020 | Liu et al. |
| 2020/0137806 | A1 | 4/2020 | Islam et al. |
| 2020/0146058 | A1 | 5/2020 | Xu et al. |
| 2020/0187150 | A1 | 6/2020 | Eisner |
| 2020/0221392 | A1 | 7/2020 | Xue et al. |
| 2020/0228993 | A1 | 7/2020 | Gunasekara et al. |
| 2020/0252933 | A1 | 8/2020 | Hmimy et al. |
| 2020/0275457 | A1 | 8/2020 | Hmimy |
| 2020/0288523 | A1 | 9/2020 | Patil et al. |
| 2020/0296627 | A1 | 9/2020 | Arvidson et al. |
| 2020/0305159 | A1 | 9/2020 | Raghothaman et al. |
| 2020/0313838 | A1 | 10/2020 | Jin et al. |
| 2020/0337054 | A1 | 10/2020 | Kwok et al. |
| 2020/0344515 | A1 | 10/2020 | Wong et al. |
| 2021/0014693 | A1 | 1/2021 | Syed et al. |
| 2021/0037444 | A1 | 2/2021 | Harel |
| 2021/0051653 | A1 | 2/2021 | Park et al. |
| 2021/0058863 | A1 | 2/2021 | Kalhan |
| 2021/0076424 | A1 | 3/2021 | Mukherjee et al. |
| 2021/0105633 | A1 | 4/2021 | Vaidya et al. |
| 2021/0126662 | A1 | 4/2021 | Solichien |
| 2021/0127423 | A1 | 4/2021 | Park et al. |
| 2021/0136838 | A1 | 5/2021 | Khalid et al. |
| 2021/0167883 | A1 | 6/2021 | Yoon |
| 2021/0204322 | A1 | 7/2021 | Lou et al. |
| 2021/0211887 | A1 | 7/2021 | Jones |
| 2021/0219303 | A1 | 7/2021 | Khalid et al. |
| 2021/0227396 | A1 | 7/2021 | Khalid et al. |
| 2021/0234648 | A1 | 7/2021 | Parekh et al. |
| 2021/0235495 | A1 | 7/2021 | Xu et al. |
| 2021/0266914 | A1 | 8/2021 | Yoo et al. |
| 2021/0274499 | A1 | 9/2021 | Hmimy et al. |
| 2021/0274506 | A1 | 9/2021 | Raghavan et al. |
| 2021/0297979 | A1 | 9/2021 | Hmimy et al. |
| 2021/0328664 | A1 | 10/2021 | Schwab et al. |
| 2021/0345411 | A1 | 11/2021 | Li et al. |
| 2021/0376905 | A1 | 12/2021 | Zhou et al. |
| 2022/0007374 | A1 | 1/2022 | Sevindik et al. |
| 2022/0078804 | A1 | 3/2022 | Hmimy |
| 2022/0132524 | A1 | 4/2022 | Mueck et al. |
| 2022/0167176 | A1 | 5/2022 | Khalid |
| 2022/0183093 | A1 | 6/2022 | Sevindik et al. |
| 2022/0191675 | A1 | 6/2022 | Mukherjee |
| 2022/0240304 | A1 | 7/2022 | Wang et al. |
| 2022/0407653 | A1 | 12/2022 | Kakishima et al. |
| 2023/0012713 | A1 | 1/2023 | Khalid et al. |

FOREIGN PATENT DOCUMENTS

| | | | |
|---|---|---|---|
| EP | 3797546 | A1 | 3/2021 |
| GB | 2585394 | A | 1/2021 |
| JP | 2021510973 | A | 4/2021 |
| WO | WO-2013020599 | A1 | 2/2013 |
| WO | WO-2017130494 | A1 | 8/2017 |
| WO | WO-2017186294 | A1 | 11/2017 |
| WO | WO-2017195078 | A1 | 11/2017 |
| WO | WO-2019067120 | A1 | 4/2019 |
| WO | WO-2019132980 | A1 | 7/2019 |
| WO | WO-2019139691 | A1 | 7/2019 |
| WO | WO-2019140461 | A1 | 7/2019 |
| WO | WO-2019226838 | A1 | 11/2019 |
| WO | WO-2020160403 | A1 | 8/2020 |
| WO | WO-2020167222 | A2 | 8/2020 |
| WO | WO-2021050957 | A1 | 3/2021 |
| WO | WO-2021067810 | A1 | 4/2021 |
| WO | WO-2021086986 | A1 | 5/2021 |

OTHER PUBLICATIONS

3GPP Release 13 to Release 15 and Beyond, "Wireless Technology Evolution to Wards 5G:" Published by 5G americas , Feb. 2017, 243 pages.

Ramaswamy V and Correia J.T., et al., "Enabling Spectrum Sharing Between LTE and RADAR Systems in S-band", The MITRE Corporation 202 Burlington Road, Bedford, MA 01730, 2017, 6 Pages.

Co-pending U.S. Appl. No. 15/902,833, filed Feb. 22, 2018.

Deering, S., et al., "Internet Protocol, Version 6 (IPv6) Specification," Internet Engineering Task Force (IETF) RFC 2460, Dec. 1998, 39 pages.

IEEE Std. 802.11 or related standards including 802.11a/b/g/n/s/v/ac/ad/ax/ay/ba/be or 802.11-2012/2013, 802.11-2016.

"Internet Protocol, DARPA Internet Program, Protocol Specification", IETF RCF 791, Sep. 1981, 50 pages.

Michael R. S., et al., "Effect of Federal Incumbent Activity or on CBRS CommercialService," IEEE2019 International Symposium on Dynamic Spectrum Access Networks (DySPAN), 2019, 5 pages.

Palola M., et al., "Field Trial of the 3.5 GHz Citizens Broadband

(56) References Cited

OTHER PUBLICATIONS

Radio Service Governed by a Spectrum Access System (SAS)," IEEE International Symposium on Dynamic Spectrum Access Networks, 2017, 9 pages.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Souryal, Michael R., et al., "Effect of Federal Incumbent Activity on CBRS Commercial Service", International Symposium on Dynamic Spectrum Access Networks (DySPAN), IEEE 2019, 5 pages.

* cited by examiner

GAA SPECTRUM SHARING AMONG CBSDs OF DIFFERENT OPERATORS IN A GIVEN REGION SERVED BY DIFFERENT SASs

METHODS AND APPARATUS FOR WIRELESS SPECTRUM ALLOCATION ACROSS MULTIPLE ENTITIES

PRIORITY AND RELATED APPLICATIONS

This application is a divisional of and claims priority to co-owned and co-pending U.S. patent application Ser. No. 17/536,960 filed on Nov. 29, 2021 entitled "METHODS AND APPARATUS WIRELESS SPECTRUM ALLOCATION ACROSS MULTIPLE ENTITIES," and issuing as U.S. Pat. No. 11,778,480 on Oct. 3, 2023, which is a continuation of and claims priority to co-owned U.S. patent application Ser. No. 16/557,498 filed on Aug. 30, 2019 entitled "METHODS AND APPARATUS FOR ALLOCATION AND RECONCILIATION OF QUASI-LICENSED WIRELESS SPECTRUM ACROSS MULTIPLE ENTITIES," and issued as U.S. Pat. No. 11,190,948 on Nov. 30, 2021, which is a continuation of and claims priority to co-owned U.S. patent application Ser. No. 15/902,833 filed on Feb. 22, 2018, entitled "METHODS AND APPARATUS FOR ALLOCATION AND RECONCILIATION OF QUASI-LICENSED WIRELESS SPECTRUM ACROSS MULTIPLE ENTITIES," and issued as U.S. Pat. No. 10,405,192 on Sep. 3, 2019, which claims priority to U.S. Provisional Patent Application Ser. No. 62/617,549 filed on Jan. 15, 2018 and entitled "METHODS AND APPARATUS FOR ALLOCATION AND RECONCILIATION OF QUASI-LICENSED WIRELESS SPECTRUM," and U.S. Provisional Application Ser. No. 62/617,976 filed on Jan. 16, 2018 and entitled "METHODS AND APPARATUS FOR ALLOCATION AND RECONCILIATION OF QUASI-LICENSED WIRELESS SPECTRUM ACROSS MULTIPLE ENTITIES," each of the foregoing incorporated herein by reference in its entirety.

This application is also related to co-owned and co-pending U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", as well as Ser. No. 15/785,283 filed Oct. 16, 2017 and entitled "METHODS AND APPARATUS FOR COORDINATED UTILIZATION OF QUASI-LICENSED WIRELESS SPECTRUM," and Ser. No. 15/814,133 filed Nov. 15, 2017 and entitled "METHODS AND APPARATUS FOR UTILIZATION OF QUASI-LICENSED WIRELESS SPECTRUM FOR IOT (INTERNET-OF-THINGS) SERVICES," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing utilization of quasi-licensed radio frequency spectrum, such as for example those providing connectivity via Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA + up to 21 Mbit/s). |
| | 1900 MHz PCS, Band 2 (UMTS/HSPA + up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz - 6.795 MHz | A | 6.78 MHz | Subject to local acceptance | Fixed service & mobile service |
| 13.553 MHZ - 13.567 MHz | B | 13.56 MHz | Worldwide | Fixed & mobile services except aeronautical mobile (R) service |
| 26.957 MHz - 27.283 MHz | B | 27.12 MHz | Worldwide | Fixed & mobile service except aeronautical mobile service, CB radio |
| 40.66 MHZ - 40.7 MHz | B | 40.68 MHz | Worldwide | Fixed, mobile services & earth exploration-satellite service |
| 433.05 MHZ - 434.79 MHz | A | 433.92 MHz | only in Region 1, subject to local acceptance | amateur service & radiolocation service, additional apply the provisions of footnote 5.280 |
| 902 MHz - 928 MHz | B | 915 MHz | Region 2 only (with some exceptions) | Fixed, mobile except aeronautical mobile & radiolocation service; in Region 2 additional amateur service |
| 2.4 GHz - 2.5 GHz | B | 2.45 GHz | Worldwide | Fixed, mobile, radiolocation, amateur & amateur-satellite service |
| 5.725 GHZ - 5.875 GHz | B | 5.8 GHz | Worldwide | Fixed-satellite, radiolocation, mobile, amateur & amateur-satellite service |
| 24 GHz - 24.25 GHz | B | 24.125 GHz | Worldwide | Amateur, amateur-satellite, radiolocation & earth exploration-satellite service (active) |
| 61 GHz - 61.5 GHz | A | 61.25 GHz | Subject to local acceptance | Fixed, inter-satellite, mobile & radiolocation service |
| 122 GHz - 123 GHz | A | 122.5 GHz | Subject to local acceptance | Earth exploration-satellite (passive), fixed, inter-satellite, mobile, space research (passive) & amateur service |
| 244 GHz - 246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. Additional spectrum (such as within the 3.10 to 4.2 GHz band) may be allocated by the FCC for these purposes as well. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, with regard to currently identified spectrum, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Federal Spectrum Access Systems (FSAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the e.g., 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access users are permitted to use any portion of the 3550-3700 MHz band not assigned to a higher tier user and may also operate opportunistically on unused Priority Access channels. See FIG. 2*a*.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard FSAS 202 includes the following elements: (1) CBSD registration; (2) interference analysis; (3) incumbent protection; (4) PAL license validation; (5) CBSD channel assignment; (6) CBSD power limits; (7) PAL protection; and (8) F SAS-to-F SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the FSAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to Commercial SAS (CSAS), not shown, and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6m in length if outdoor). Category B CBSDs have 47 dBm EIRP (50 Watts)/10 MHz, and fixed outdoor location only. Professional installation of Category B CBSDs is required, and the antenna must be less than 6m in length. All CBSD's have a vertical positioning accuracy requirement of +/−3m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Fair and Equitable Spectrum Allocation—

Extant CBRS architectures, while promising from the standpoint of reduced contention for spectrum, currently lack intra-network and extra-network coordination and integration, as well as implementation any framework for fair, equitable and efficient GAA spectrum allocation among e.g., the various SASs which may be part of a given region or operational area (especially in instances where two or more SASs are controlled by different/disparate entities which may not have any other inter-SAS communication with one another). No allocation mechanisms are currently mandated by the FCC for CBRS GAA spectrum.

Fair and equitable spectrum allocation can be of critical importance to those utilizing the spectrum, especially for commercial purposes. User perceptions of reduced availability/slow data service can negatively impact continued use and profitability of the service by any given service provider if it is constantly being "edged out" of bandwidth/spectrum allocation, especially if the service provider does not have any licensed spectrum available to it (e.g., for cellular data services such as LTE/LTE-A). Stated differently, since service providers such as cable or terrestrial MSOs have little or no licensed spectrum available to them, the ability to routinely and robustly access unlicensed spectrum such as CBRS GAA becomes that much more critical, especially within the context of roaming users or subscribers (e.g., MSO subscribers which roam from their normal service location, and hence must access communication modalities other than those normally accessible to them on their served premises, such as DOCSIS cable modems, Wi-Fi APs, etc.).

SUMMARY

The present disclosure addresses the foregoing needs by providing, inter alia, methods and apparatus for providing wireless spectrum allocation and reconciliation across multiple SASs serving diverse CBSDs, including across a number of different networks, network operators, and their associated infrastructures.

In one aspect, a method for providing wireless spectrum allocation is disclosed. In one embodiment, the wireless spectrum being allocated comprises CBRS-band spectrum with the GAA portion, and the method includes communicating data between a plurality of SAS entities associated with a common region or area.

In one variant, the communication of data includes communicating proposed allocations of GAA spectrum between the SAS entities, and harmonization of the allocations according to a commonly agreed-to protocol.

In another aspect, a method for providing allocation of an available unlicensed or quasi-licensed wireless spectrum to a plurality of wireless network infrastructures is disclosed. In one embodiment, the method includes: (i) obtaining data relating to one of said plurality of wireless network infrastructures at a first participating entity; (ii) generating, via the first participating entity, (a) data indicative of a proposed allocation for the one wireless network infrastructure; and (b) data indicative of a proposed allocation for a wireless network infrastructure associated with a second participating entity; (iii) providing to the second participating entity, the data indicative of the proposed allocation for the one wireless network infrastructure, and the data indicative of the proposed allocation for a wireless network infrastructure associated with a second participating entity; (iv) receiving from the second participating entity: (c) data indicative of a proposed allocation for the one wireless network infrastructure generated by the second participating entity; and (d) data indicative of a proposed allocation for a wireless network infrastructure associated with the second participating entity generated by the second participating entity; (v) based at least on (a) the data indicative of the proposed allocation for the one wireless network infrastructure, (b) the data indicative of the proposed allocation for a wireless network infrastructure associated with a second participating entity, (c) the data indicative of a proposed allocation for the one wireless network infrastructure generated by the second participating entity, and (d) the data indicative of a proposed allocation for a wireless network infrastructure associated with the second participating entity generated by the second participating entity, calculating at least one updated metric; (vi) updating a dynamic allocation algorithm with respect to the at least one updated metric; and (vii) performing a subsequent iteration of said steps (ii)-(vi) until the dynamic allocation algorithm converges on a final allocation, said final allocation comprising an allocation of wireless spectrum which is less than or equal to said available wireless spectrum.

In one variant, the wireless spectrum being allocated includes GAA CBRS spectrum within the 3.550 to 3.700 GHz band (e.g., Band 48), and the first participating entity includes a SAS entity serving the one wireless network infrastructure.

In one implementation, the one wireless network infrastructure includes a plurality of CBSDs, and the obtained data relating to one of said plurality of wireless network infrastructures includes data relating to the CBSDs.

In a further variant, the allocation of the unlicensed or quasi-licensed spectrum includes: transmitting data to a domain proxy (DP), the DP configured to communicate at least a portion of the data to a Spectrum Access System (SAS) to obtain access to a Citizens Broadband Radio Service (CBRS) band; receiving from the DP data indicating a CBRS band allocation; and allocating at least a portion of the CBRS band allocation for use by at least one mobile client device in communicating with an access point of the RAN.

In another aspect of the disclosure, a method is disclosed whereby one or more SAS entities can reconcile spectrum allocations on a per-SAS basis, including in one implementation without each SAS having visibility into the other SAS' particular internal (served) infrastructure or elements thereof.

In a further aspect of the disclosure, a method is disclosed whereby one or more SAS entities can reconcile spectrum allocations on a per-CBSD basis, whether independently or in conjunction with the per-SAS basis allocation above.

In another aspect of the disclosure, network apparatus for use within a first network is disclosed. In one embodiment, the network apparatus is configured to generate proposed allocations of spectrum within a quasi-licensed frequency band to support region-wide spectrum allocations, and includes: digital processor apparatus; network interface apparatus in data communication with the digital processor apparatus and configured to transact data with one or more computerized entities of the second network; and a storage apparatus in data communication with the digital processor apparatus and comprising at least one computer program.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device, such as an MSO controller, DP, or SAS entity. In another embodiment, the apparatus includes a program memory, HDD or SSD on a computerized access node (e.g., CBSD).

In a further aspect, a system architecture for allocation of unlicensed or quasi-licensed spectrum among a plurality of operators is disclosed.

In still another aspect, an algorithmic engine is disclosed. In one embodiment, the engine comprises a plurality of computer-executable instructions which are configured to, when executed, implement a Fair and Equitable Allocation Routine (FEAR) to support spectrum allocations across an operating region, including across multiple network operators and SAS entities.

In a further aspect, computerized apparatus configured for wireless spectrum allocation is disclosed. In one embodiment, the computerized apparatus includes: digital processor apparatus; at least one data interface in data communication with the digital processor apparatus; and computerized logic in data communication with the digital processor apparatus, the computerized logic configured to, when executed, cause allocation of an available wireless spectrum to a plurality of wireless network infrastructures via iteration according to a convergence algorithm of the computerized logic, the convergence algorithm configured to utilize a plurality of proposed allocations generated by respective ones of the plurality of wireless network infrastructures.

These and other aspects shall become apparent when considered in light of the disclosure provided herein.

BRIEF DESCRIPTION OF THE DRAWINGS

FIG. 4*b*-1 is a functional block diagram of a first exemplary embodiment of a quasi-licensed wireless network architecture useful with various aspects of the present disclosure, including operator domains and SAS vendor domains.

FIG. 4*b*-2 is a functional block diagram of a second exemplary embodiment of a quasi-licensed wireless network architecture useful with various aspects of the present disclosure, including operator domains and SAS vendor domains.

FIG. 5*a*-1 is logical flow diagram of one exemplary implementation of a method for reconciliation processing under the Fair and Equitable Allocation Routine (FEAR) processing of the method of FIG. 5*a*.

FIG. 5*a*-2 is logical flow diagram of another exemplary implementation of a method for reconciliation processing under the Fair and Equitable Allocation Routine (FEAR) processing of the method of FIG. 5*a*.

Figure 1:
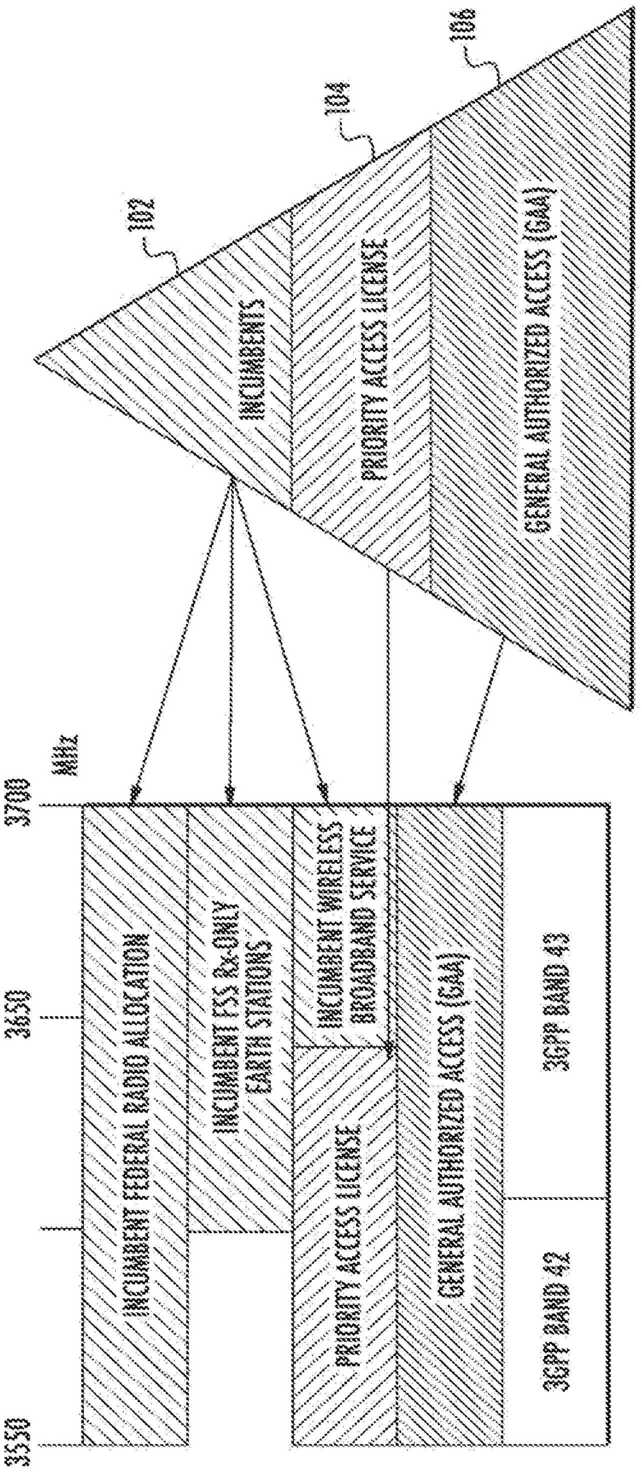
FIG. 1 (PRIOR ART)
FIG. 1 is a graphical illustration of prior art CBRS (Citizens Broadband Radio Service) users and their relationship to allocated frequency spectrum in the 3.550 to 3.700 GHz band.

All figures © Copyright 2017-2018 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PC S/DC S, LTE/LTE-A/LTE-U/LTE-LAA, analog cellular, CDPD, satellite systems, millimeter wave or microwave systems, acoustic, and infrared (i.e., IrDA).

Overview

In one exemplary aspect, the present disclosure provides improved methods and apparatus for allocation of wireless spectrum, such as "quasi-licensed" spectrum such as that provided by the recent CBRS technology initiatives (e.g., GAA or General Authorized Access) spectrum as shown in FIG. 1 herein.

In an exemplary embodiment, a network architecture is provided which allows two or more SAS entities (e.g., two FSASs, and FSAS and a CSAS, and so forth) to exchange data and metrics according to a prescribed allocation protocol, thereby ensuring, inter alia, fair and equitable allocation of the available CBRS GAA spectrum across multiple users (e.g., service providers/network operators) with a given region or operational area.

In one exemplary approach of the present disclosure, one or more participating SAS entities generate proposed initial allocations based on e.g., data relating to CBSDs within their own networks (such as the number of CBSDs, physical parameters relating thereto, projected or actual bandwidth demands). The participating SAS entities then exchange proposed initial allocations, and further calculate proposed allocations for the other participating SAS entities based on (i) their own initial allocations, and (ii) the received proposed allocations for the other SAS entities. Data regarding these proposed allocations is again exchanged, and a "reconciliation" algorithm applied as needed to reconcile differences between a given SAS entity's indigenous proposed allocation and that generated by the one or more other participating SAS entities, so as to arrive at an equitable distribution of e.g., GAA available spectrum.

In one implementation of the foregoing, the reconciliation algorithm is applied iteratively; e.g., in step increment variations of one or more parameters, such that the aforementioned equitable solution is achieved. In this fashion, no particular SAS entity is disproportionately affected (or benefitted) over others.

In another implementation, the foregoing process is repeated based on one or more prescribed criteria, such as e.g., (i) a change in GAA allocation passed down from a cognizant entity (e.g., FSAS), (ii) expiration of a prescribed period of time, (iii) addition/removal of one or more CBSDs within an operator domain, and/or (iv) addition or removal of new operators/domains.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitation above 4.0 GHz (e.g., currently proposed allocations up to 4.2 GHz), and down to e.g., 3.1 GHz.

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of unlicensed spectrum, it will be appreciated by those of ordinary skill given the present disclosure that various of the methods and apparatus described herein may be applied to allocation of spectrum or bandwidth between two or more entities within a licensed spectrum context; e.g., for cellular voice or data bandwidth/spectrum allocation, such as in cases where a given service provider is approaching or meeting their capacity limit on available spectrum.

Other features and advantages of the present disclosure will immediately be recognized by persons of ordinary skill in the art with reference to the attached drawings and detailed description of exemplary embodiments as given below.

Service Provider Network—

Figure 3A:
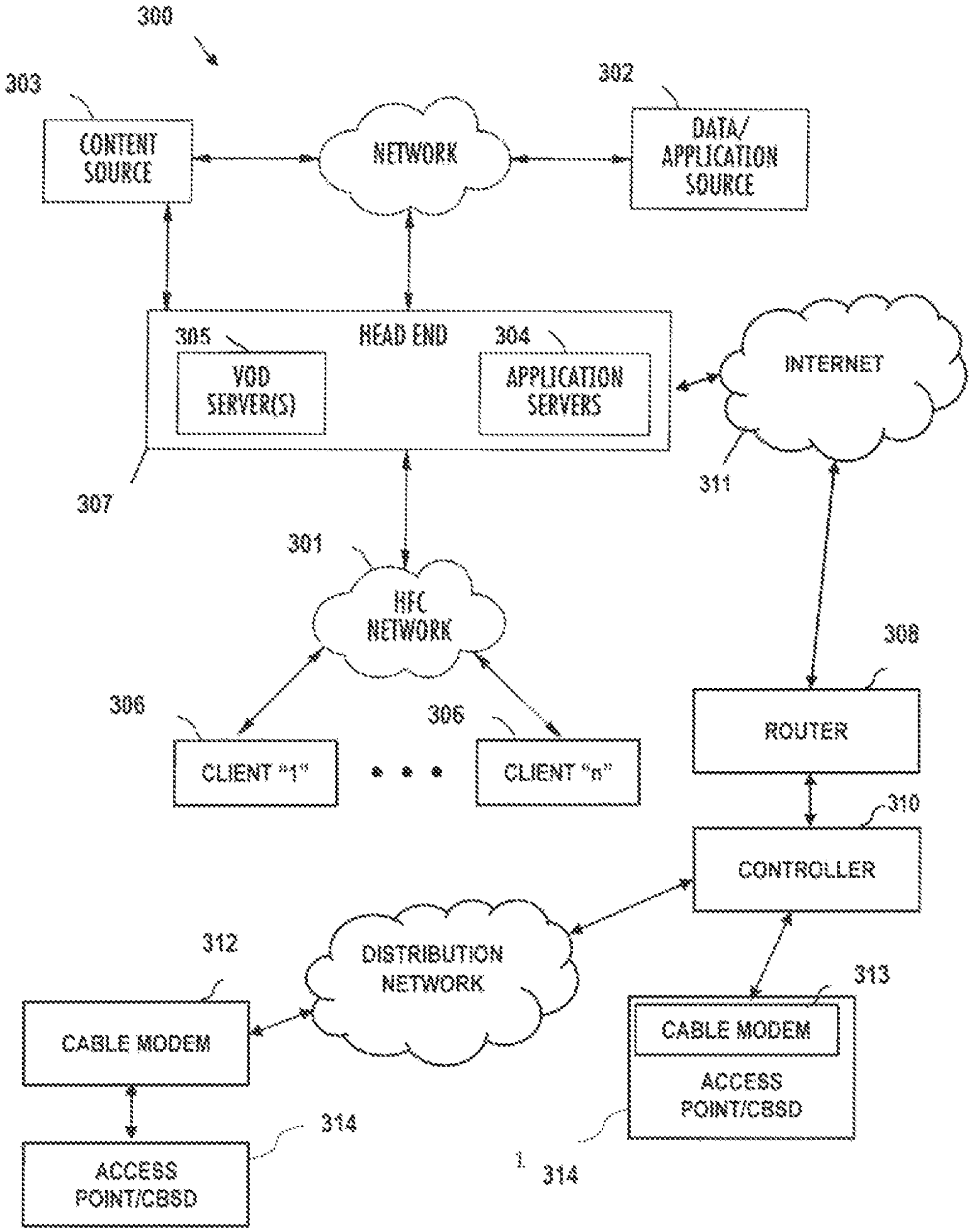
FIG. 3*a* is a functional block diagram illustrating an exemplary hybrid fiber network configuration useful with various aspects of the present disclosure.

FIG. 3*a* illustrates a typical service provider network configuration useful with the features of the fair and equitable allocation system and CBRS-based wireless network (s) described herein. It will be appreciated that while described with respect to such network configuration, the spectrum allocation methods and apparatus described herein may readily be used with other network types and topologies, whether wired or wireless, managed or unmanaged.

The exemplary service provider network 300 is used in one embodiment of the disclosure to provide backbone and Internet access from the service provider's wireless access nodes (e.g., CBSDs, Wi-Fi APs or base stations 314 operated or maintained by the service provider or its customers/subscribers), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user).

As described in greater detail subsequently herein with respect to FIG. 4*a*, one or more controllers 310 are utilized for, inter alia, control of the wireless network access nodes 314 at least partly by the MSO. As opposed to an unmanaged network, the managed service-provider network 300 of FIG. 3*a* advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes. For example, the service provider network 300 allows components at a venue of interest (e.g., CBSDs, Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals, or even simply to enhance user experience using one RAT (e.g., CBRS) when another RAT (e.g., WLAN is sub-optimal for whatever reason). It also permits communication of data from the CBSDs backwards towards the controller, including configuration and demand data relating to the individual CBSDs for purposes of fair and equitable spectrum allocation, as described subsequently herein with respect to FIGS. 4*a* et seq.

In certain embodiments, the service provider network 300 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user authentication; (ii) correlation of aspects of the event or venue to particular subscriber demographics, such as for delivery of targeted advertising; and (iii) determination of subscription level, and hence subscriber privileges and access to content/features. Moreover, device profiles for particular user devices can be maintained by the MSO, such that the MSO (or its automated proxy processes) can model the user device for wireless capabilities.

The wireless access nodes 314 disposed at the service location(s) (e.g., areas or venue(s) of interest) can be coupled to the bearer managed network 300 (FIG. 3*a*) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314. The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3*a* for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered access nodes 314 (and other components) may be linked to each other or cascaded via such structure.

Figure 3B:
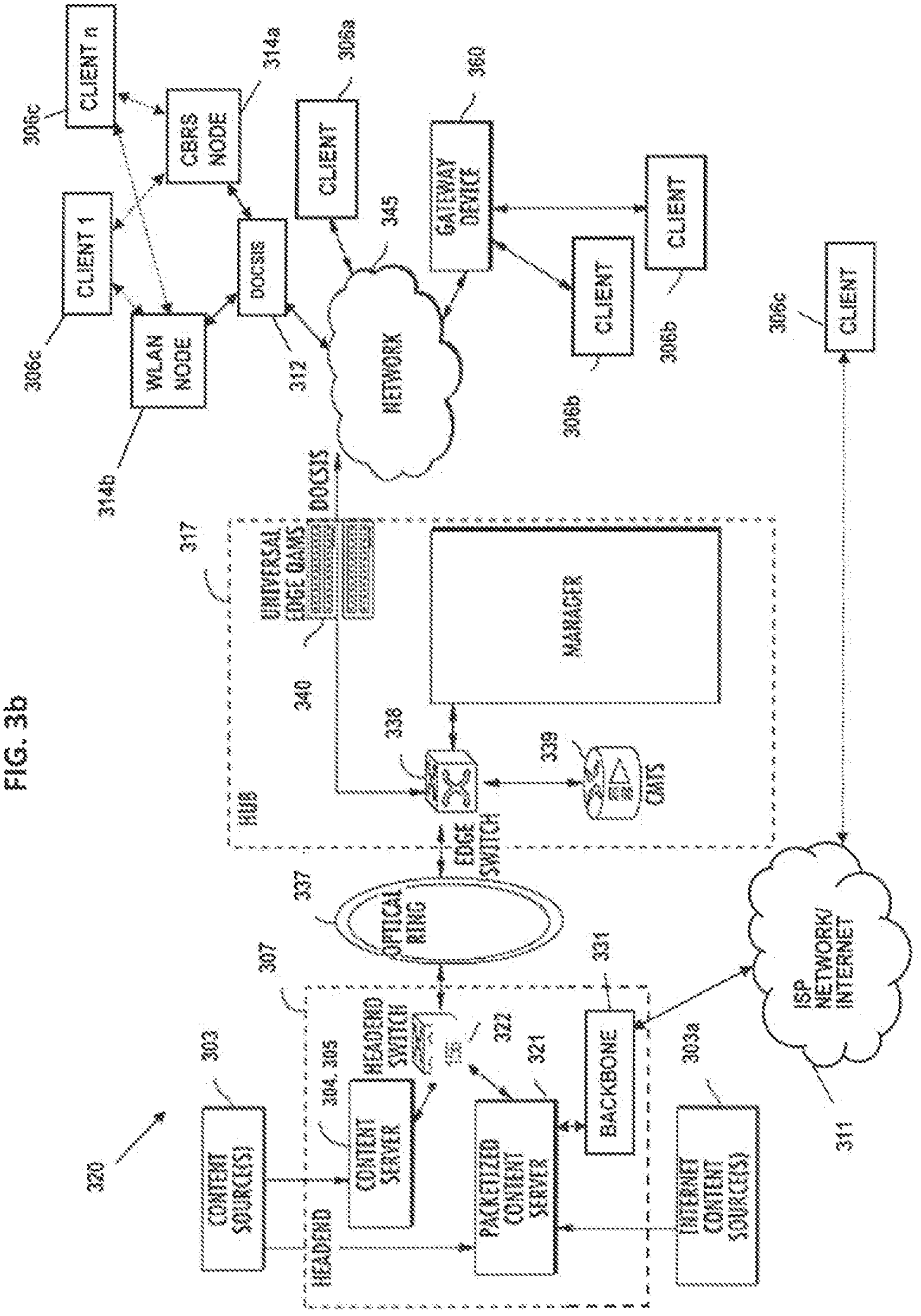
FIG. 3*b* is a functional block diagram of an exemplary packetized content network architecture useful in conjunction with various principles described herein.

FIG. 3*b* illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3*b* may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3*b* generally includes one or more headends 307 in communication with at least one hub 317 via an optical ring 337. The distribution hub 317 is able to provide content to various user/client devices 306, and gateway devices 360 as applicable, via an interposed network infrastructure 345.

As described in greater detail below, various content sources 303, 303*a* are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303*a* (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3*b* may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOC SIS QAMs, such as via IPTV or similar models with QoS applied.

Individual client devices such as cable modems 312 and associated end-user devices 306*a*, 306*b* of the implementation of FIG. 3*b* may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306*a*, 306*b*, 306*c* in communication therewith.

In one implementation, the CM 312 shown in FIG. 3*b* services an area which may includes a venue, such as a conference center or hospitality structure (e.g., hotel), which includes a CBRS node 314*a* for CBRS-band (3.5 GHz) access, and a WLAN (e.g., Wi-Fi) node 314*b* for WLAN access (e.g., within 2.4 GHz ISM band). Notably, the client devices 306*c* communicating with the access nodes 314*a*, 314*b*, as described in greater detail subsequently herein, can utilize either RAT (CBRS or WLAN) depending on, inter alia, directives received from the MSO controller 310 (FIG. 3*a*) via one access node 314 or the other, or even indigenous logic on the client device 306*c* enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306*c* via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306*c* utilizing an Internet browser or MSO/third-party app to stream content according to an HTTP-based approach).

Wireless Services Architecture—

Figure 4A:
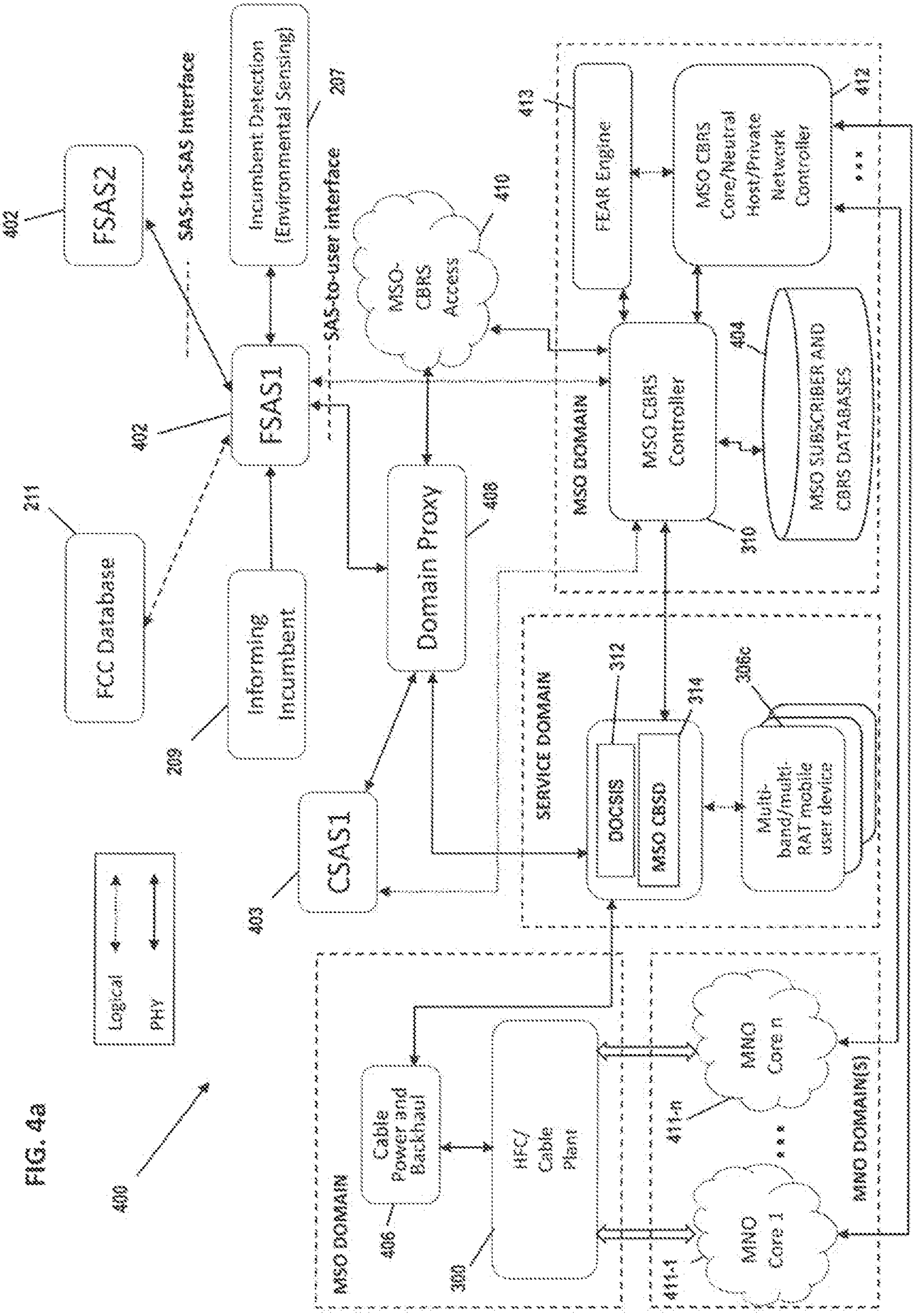
FIG. 4*a* is a functional block diagram of a first exemplary embodiment of a quasi-licensed wireless network infrastructure useful with various aspects of the present disclosure.

FIG. 4*a* illustrates an exemplary embodiment of a network architecture 400 useful in implementing the unlicensed spectrum allocation and CBRS-based wireless RAT access methods of the present disclosure. As used in the present context, the term "users" may include without limitation end users (e.g., individuals, whether subscribers of the MSO network, the MNO network, or other), venue operators, third party service providers, or even entities within the MSO itself (e.g., a particular department, system or processing entity).

As shown, the architecture generally includes an MSO-maintained CBRS controller 310 (which may be disposed remotely at the backend or headend of the system within the MSO domain as shown or at the served venue, or at an intermediary site), a CBRS Core/Neutral Host/Private Network Controller 413, a Fair and Equitable Allocation Routine (FEAR) engine 413 in data communication with the CBRS controller 310, an MSO-maintained subscriber and CBRS database 404, one or more CBSD access nodes 314 in data communication with the CBRS controller 310 (e.g., via existing network architectures including any wired or wireless connection), as well as any number of client devices 306*c* (smartphones, laptops, tablets, watches, vehicles, etc.). The CBSD 314 includes in the illustrated embodiment an embedded cable modem 312 used for communication with a corresponding CMTS 339 (FIG. 3*b*) within the MSO's (e.g., cable) plant 300 via cable power and backhaul infrastructure 406, including high-data bandwidth connections to the MSO's backbone 331, and electrical power for the CBSD. A MNO (mobile network operator) network 411 also may communicate with the MSO network via the backhaul 406, such as for inter-operator communications regarding common users/sub scribers.

As shown in FIG. 4*a*, in operation, the Domain Proxy (DP) 408 is in logical communication with the CBSD disposed at the venue (either directly, as shown, or via MSO backend network infrastructure) and the MSO CBRS controller 310. The DP 408 provides, inter alia, FSAS interface for the CBSD, including directive translation between CBSD 314 and FSAS commands, bulk CBSD directive processing, and interference contribution reporting to the FSAS (i.e., to help an SAS tune or update its predictive propagation models and detect realistic interference issues once CBSDs are deployed, the CBSDs can provide signal strength and interference level measurements).

The MSO controller 310 in the illustrated embodiment communicates with the DP 208 via an MSO CBRS access network 410, which may be a public internetwork (e.g., the Internet), private network, or other, depending on any security and reliability requirements mandated by the MSO and/or SAS.

As used herein, a CBRS "domain" is defined is any collection of CBSDs 314 that are or need to be grouped for management, whether logically or by other scheme; e.g.: according to network operator (NO), according to a serving SAS vendor, and/or by physical disposition (e.g., within a large enterprise, venues, certain geographic area, etc.) In the embodiment of FIG. 4*a*, the DP 408 aggregate control information flows to the FSAS1 402 and/or any participating Commercial SAS (C SAS) 403, and generates performance reports, channel requests, heartbeats, and other types of data, including data necessary for operation of the spectrum allocation algorithms described in greater detail subsequently herein. In the illustrated embodiment, the DP 408 is operated by a third-party service provider, although it will be appreciated that the MSO may operate and maintain the DP 408, and or operate/maintain its own internal DP, such as for channel request processing, aggregation, reporting, and other of the above-listed functions for the MSO's internal CBRS domains, for interface with an external DP 408.

Figure 4B:
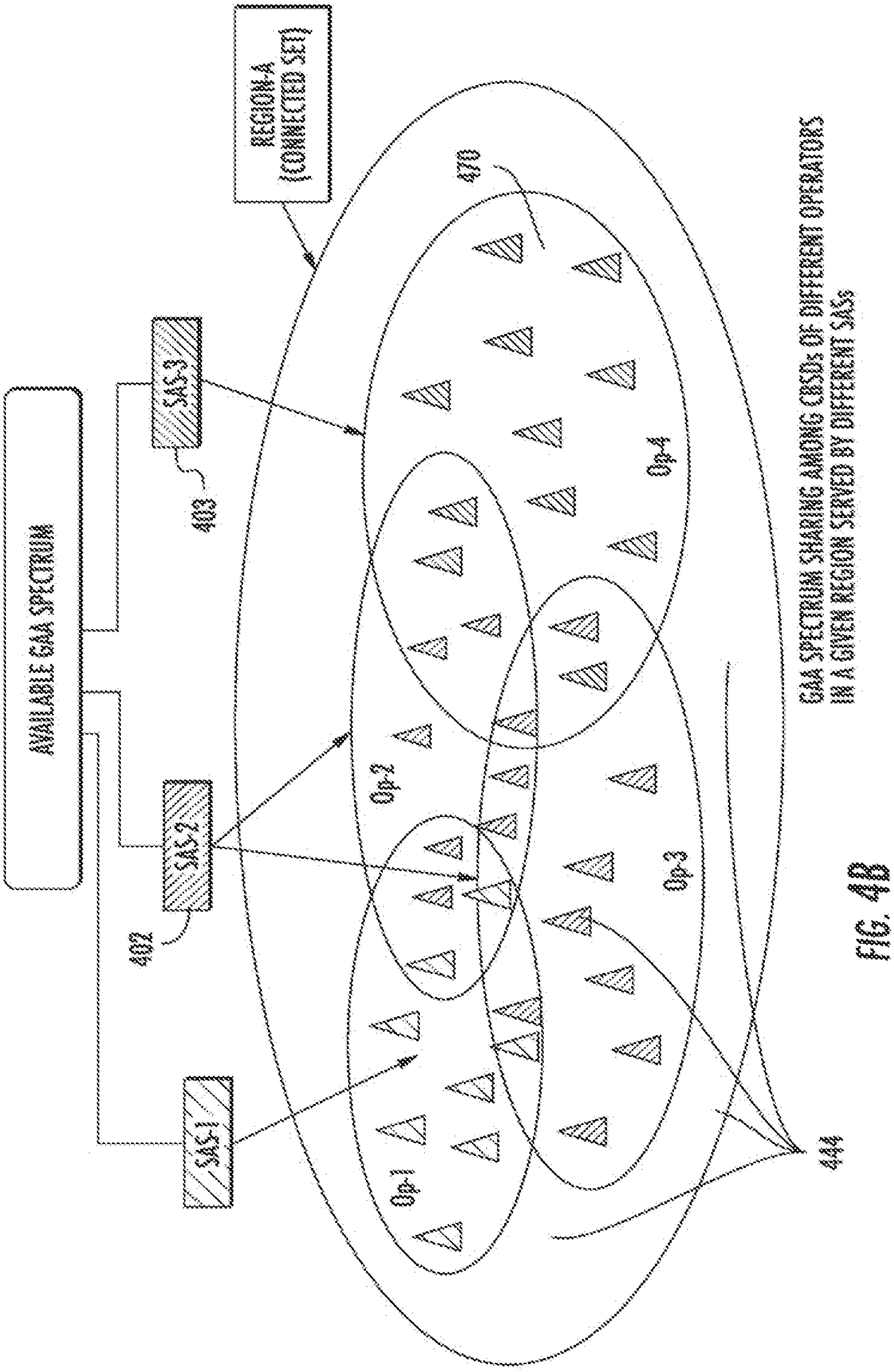
FIG. 4*b* is a graphical representation of GAA spectrum allocation across multiple SAS entities and NOs within a prescribed service region according to one embodiment of the disclosure.
Figures 1, 4B:
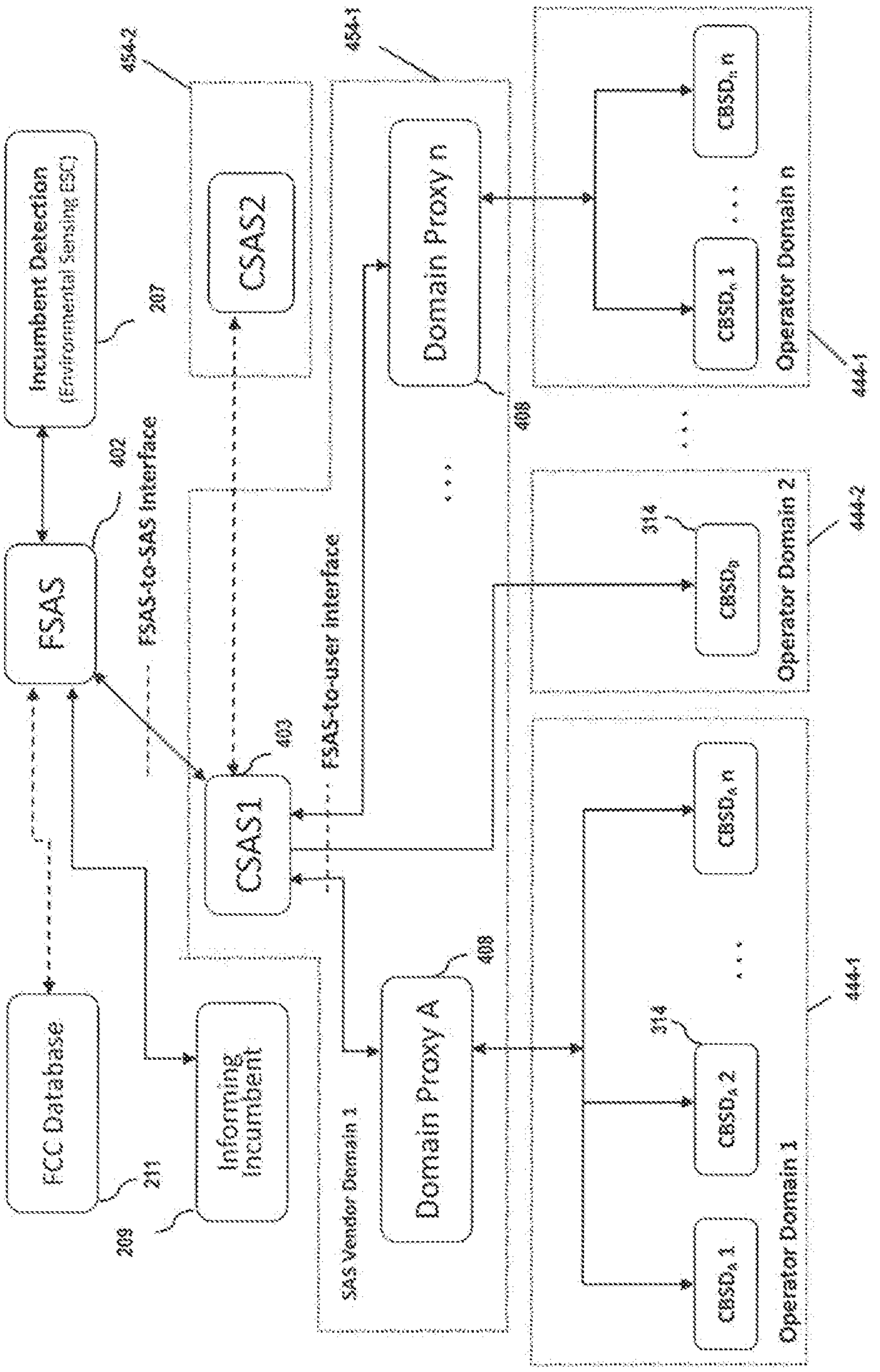
Figures 2, 4B:
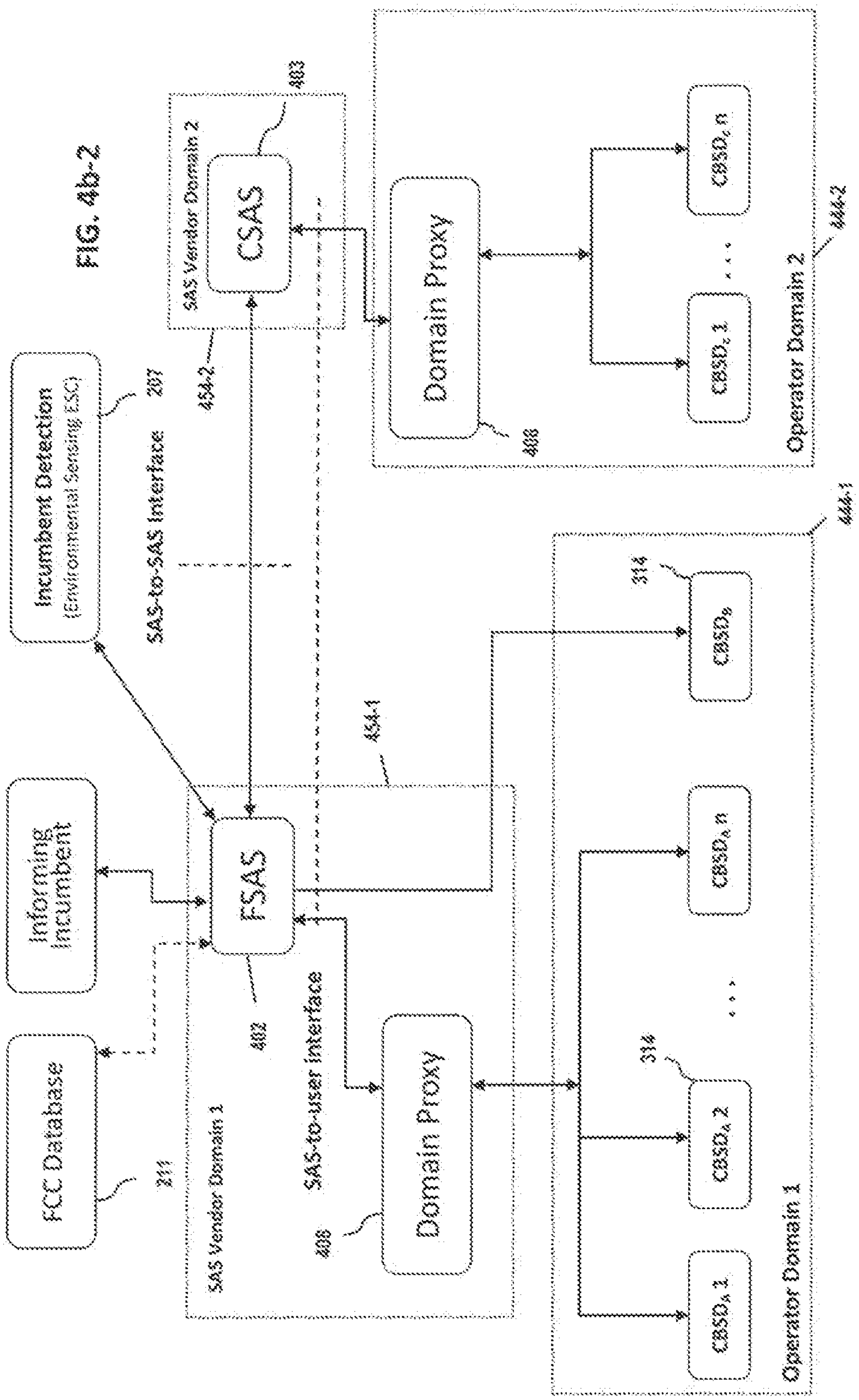

FIG. 4*b* provides a graphical illustration of an exemplary service region (Region A 470) within which multiple service providers (e.g., NOs) provide CBRS-band service within their respective domains 444. It is noted in passing that service areas/coverage (i.e., where users of a given NO may obtain CBRS-band service via their client device or UE) is not necessarily co-extensive with a service domain of a given NO. For example, a domain operated by a given NO may have five (5) CBSDs 314, but due to overlapping or duplicative coverage by two or more of them, the service area actually afforded to a user may be different. Hence, the term "domain" as used herein refers generally and without limitation to entities (e.g., hardware or software) or other processes under control of a given vendor or NO, while "service area" or "service region" refers generally and without limitation to geographic scope or coverage by the service provider(s) (e.g., vendor or NO); e.g., the greater San Diego metropolitan area or the like. Moreover, so-called "SAS vendors" may or may not have their own coverage area (e.g., their own CBSDs 314 and related infrastructure); they may also be "proxy" for coverage areas held by their served NO's (e.g., they may have no CBSDs or infrastructure of their own, but rather only provide support via SAS (and optionally DP) operation.

As alluded to in FIG. 4*b*, the various respective NO domains 444 may also include shared or common infrastructure (e.g., wherein a given CBSD 314 is shared among two or more NOs; e.g., in cases where only one CBSD can be physically located in a given coverage area, or for sake of economy or efficiency).

Figure 2:
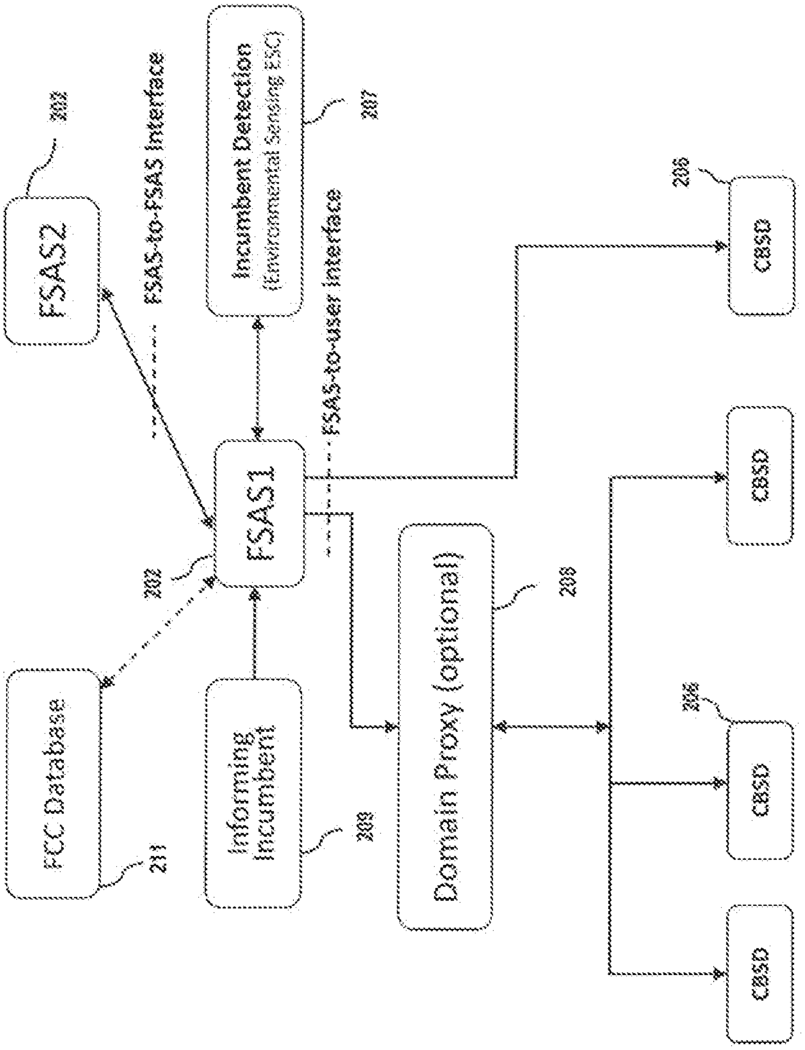
FIG. 2 (Prior Art)
FIG. 2 is a block diagram illustrating a general architecture for the CBRS system of the prior art.
Figure 2A:
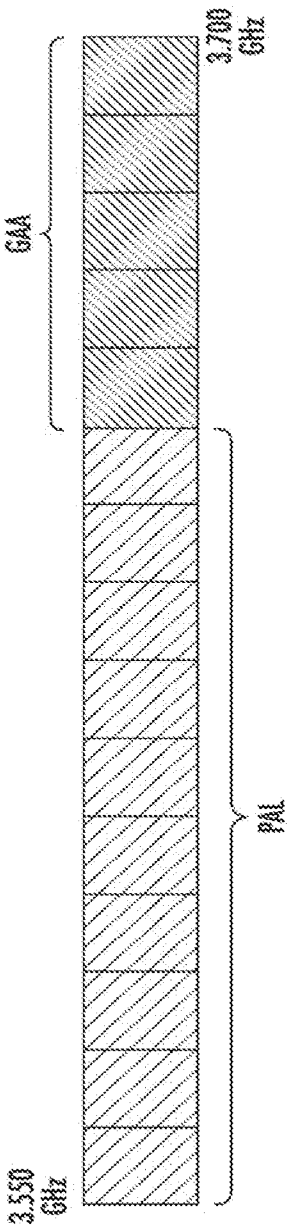
FIG. 2A (PRIOR ART)
FIG. 2*a* is a graphical representation of allocations for PAL versus GAA users within the frequency band of FIG. 2.

FIGS. 4*b*-1 and 4*b*-2 illustrate exemplary alternate configurations of FSAS 402, CSAS 403, and DPs 408 useful with the various embodiments of the spectrum allocation methodologies and apparatus described herein. It will be appreciated that these configurations are intended merely to illustrate operation of the aforementioned allocation methods and apparatus of the present disclosure, and should in no way be considered limiting. Adaptation of the methods and apparatus described herein to yet other types of configurations can be accomplished by those of ordinary skill when provided the present disclosure.

As shown in FIG. 4*b*-1, multiple operator domains 444 are serviced by respective CBSDs 314. Two domains 444-1 of the three operator domains are served by respective DPs 408 within a first SAS vendor domain 454-1. The two DPs 408 are served by a common CSAS 403, which interfaces with an FSAF 402 outside the domain 454-1 as illustrated. The third operator domain 444-2 is directly served by the CSAS (CSAS1 403), with no DP (e.g., this domain 444-2 may for example include its own internal DP, or has otherwise obviated the functions thereof). Data communications via the FSAS-SAS interface enable the implementation of various aspects of the spectrum allocation techniques described subsequently herein. The CSAS1 403 of the first vendor domain may also communicate data with other CSAS entities (e.g., CSAS 2 within the second vendor domain 454-2) in support of the spectrum allocation algorithms and procedures described subsequently herein, as may the FSAS 402.

Referring now to FIG. 4*b*-2, multiple operator domains 444 are again serviced by respective CBSDs 314. One of the two operator domains 444-1 are served by respective DPs 408 within respective SAS vendor domains 454-1 and 454-2. The two DPs 408 are served by different SAS; e.g., FSAS 402 for the first domain 454-1, which interfaces with incumbent detection apparatus 207 and the FCC database 211 (as well as informing incumbents) as illustrated. The second operator domain 444-2 and its DP 408 are served by the CSAS 403 within vendor domain 454-2. As with the configuration of FIG. 4*a*, data communications via the SAS-SAS interface enable the implementation of various aspects of the spectrum allocation techniques described subsequently herein. The CSAS 403 of the second vendor domain may also communicate data with other CSAS entities (not shown) in support of the spectrum allocation algorithms and procedures described subsequently herein, as may the FSAS 402.

It will be appreciated that various methods and apparatus described herein may selectively make use of frequency/spectral re-use algorithms to e.g., more densely pack users spatially into a given region of interest, and/or avoid "stranding" of spectrum which could otherwise be used productively. As one example of the foregoing, consider the arrangement 450 reflected in FIG. 4*c*. Here, two domains 420, 422 have area overlap 430 between the coverage areas 420-3, 422-1 of two respective CBSDs 314 of the different domains ($CBSD_A$ 3 and $CBSD_B$ 1). Otherwise, the coverage area of the two domains do not overlap. Hence, for frequency re-use purposes, allocated GAA spectrum can be re-used within all other areas of the domains, since there is no chance of interference from common use of the same frequency band(s) based on geographic separation. This potential for re-use is significant, since an ostensible maximum allocation of 150 MHz for GAA users within a region (with minimum at 80 MHz) may cause significant constraints on servicing additional users within a region without such re-use.

Returning again to FIG. 4*a*, the MSO subscriber and CBRS database 404 includes several types of data useful in operation of the system 400. As part thereof, the MSO database 404 includes data relating to, among other things: (i) CBSD identification (e.g., MAC), (ii) CBSD location, (iii) association with parent or child nodes or networks (if any), and (iv) CBRS configuration and capabilities data. The CBRS database 404 may also include MSO-maintained data on spectrum usage and historical patterns, channel withdrawals, and other data which enable the MSO to proactively "plan" channel usage and allocation within the venue(s) of interest where the CBSD(s) 314 operate.

In one variant, the MSO CBRS controller 310 includes, inter alia, optimization functions which take into consideration network state and topology, (e.g., for access networks spanning across multiple access bands and technologies, cable backhaul and the core network, such as where a 2.4 GHz Wi-Fi access network together with 2.5 GHZ and 3.5 Ghz LTE network, cable backhaul and MSO (cable) core together can be optimized in terms of requested GAA spectrum allocations), loading, and user requirements, and generate standardized requests or proposed allocations to the FSAS 402 or CSAS 403 services via the DP 408 (see discussion of FIGS. 5-6*a* and 7*a*-7*c* below). The controller 310 also "tunes" the response from FSAS/CSAS before sending it to the CBSDs 314. Specifically, in one particular implementation, mobility management and optimization is performed by the controller 310 by taking FSAS/CSAS allocations, channel change, withdrawal, and power change, and other self-optimizing network (SON) functions into account, as described in greater detail subsequently herein. The FSAS/CSAS response is first analyzed by the controller logic as to the number of affected downstream devices (e.g., how many small cells or other CBSDs are affected), and the instructions sent to the individual CBSDs in phases/groups, or according to some other scheme so as to mitigate the impact on the UEs (yet consistent with FSAS/CSAS and CBRS system requirements). In this fashion, an individual UE can be "moved around" to other CBSDs and/or frequency bands to the extent possible, and user experience preserved (i.e., little or no discontinuity in service is perceived).

In certain embodiments, each CBSD 314 is located within and/or services one or more areas within one or more venues (e.g., a building, room, or plaza for commercial, corporate, academic purposes, and/or any other space suitable for wireless access). Each CBSD 314 is configured to provide wireless network coverage within its coverage or connectivity range. For example, a venue may have a wireless modem installed within the entrance thereof for prospective customers to connect to, including those in the parking lot via inter alia, their LTE-enabled vehicles or personal devices of operators thereof. Notably, different classes of CBSD 314 (e.g., eNB) may be utilized. For instance, Class A eNBs can transmit up 30 dbm (1 watt), while Class-B eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc.

In the exemplary embodiment, one or more CBSDs 314 may be indirectly controlled by the CBRS controller 310 (i.e., via infrastructure of the MSO network), or directly controlled by a local or "client" CBRS controller disposed at the venue (not shown). Various combinations of the foregoing direct and indirect control may be implemented within the architecture 400 of FIG. 4*a* as desired. The controller 310 is implemented in this instance as a substantially unified logical and physical apparatus maintained within the MSO domain, such as at an MSO headend or hubsite, and in communication with the MNO core 411 via the MSO core function 412. In the embodiment of FIG. 4*a*, the controller 310 is configured to at least: (ii) cause generation of proposed GAA allocations, including communications with and use of calculations performed by the FEAR engine 413; (ii) dynamically monitor RF conditions and performance information in the hosting environment via use of the CBSDs 314*a*; and (iii) cause issuance of interference reports based on the data of (ii) for transmission to the DP 408 (and forwarding to the FSAS/CSAS).

The controller 310 also optionally includes algorithms to optimize operation of the "local" CBRS network maintained by the MSO, such as within a target venue or area. These optimizations may include for example: (a) utilization of the environmental interference data of (i) above to characterize the CBRS band(s) of the venue/area; (b) use the characterization of (a) to structure requests for spectrum allocation within the CBRS band(s) to the DP/SAS (e.g., which will mitigate interference or contention within the venue/are in those bands); (c) use the interference data of (i) above, and other relevant data (e.g., attendance, time, interference/signal as a function of CBSD location, etc.) to build historical profiles of spectrum use a function of various variables, including profiles particular to the venue/area itself, as described in U.S. patent application Ser. No. 15/612,630 filed Jun. 2, 2017 entitled "APPARATUS AND METHODS FOR PROVIDING WIRELESS SERVICE IN A VENUE," and issued as U.S. Pat. No. 10,645,547 on May 5, 2020, incorporated herein by reference in its entirety; (d) utilize data regarding spectrum availability withdrawals (e.g., where DoD assets require use of a previously allocated band) and other events to generate predictive or speculative models on CBRS band utilization as a function of time, including in support of proposed allocations under the FEAR model.

Figure 4C:
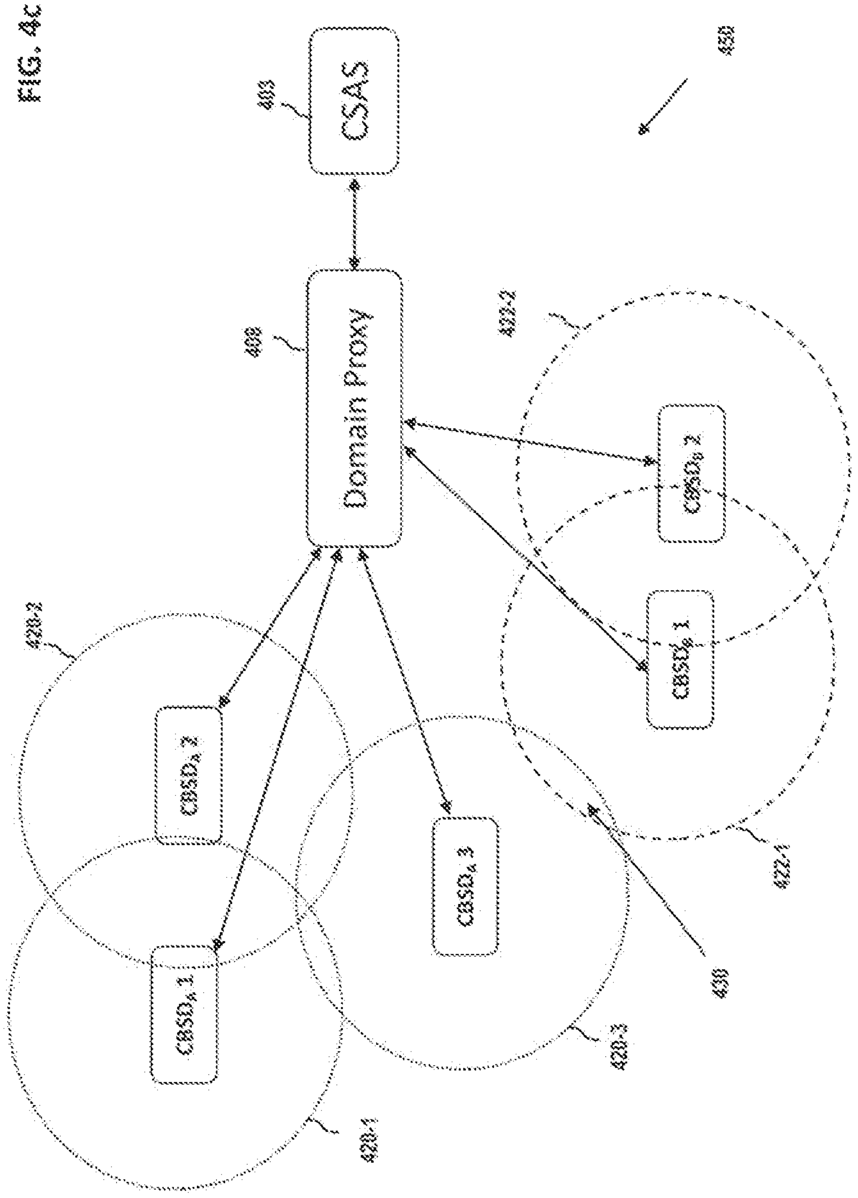
FIG. 4*c* is a graphical representation of an overlapping CBSD service coverage scenario wherein frequency re-use can be selectively applied.

In addition to the foregoing, the controller 310 may be configured to actively or passively coordinate MSO user/subscriber RAT and band allocations between CBSDs (using CBRS allocated spectrum at approximately 3.5 GHz) and e.g., Wi-Fi use of 2.4 or 5 GHz bands of ISM, so as to optimize user experience, as described in greater detail below with respect to FIG. 4*c*. See, e.g., the exemplary methods and apparatus described in co-owned U.S. patent application Ser. No. 15/677,940, issued as U.S. Pat. No. 10,536,859 on Jan. 14, 2020, previously incorporated herein.

In the exemplary embodiment, optimization functions within the MSO controller 310 takes into consideration (i) network state (both MSO and MNO networks), (ii) MSO small cell network topology, (iii) current MSO small cell network load, and (iv) user-specific requirements, and generate a standardized request to the SAS service based thereon (the "standardization" refers to the protocols/request mechanism used in contacting the SAS). The optimization functions of the controller 310 also "tune" the response from the SAS entity before sending it to the CBSD 314 and MNO Core 412 (see FIG. 4*a*). For instance, the SAS may allocate certain resources for certain periods of time, which may be yet further optimized by the controller 310 for particulars of the MSO CBRS RAN (e.g., known problematic frequency bands deleted from the allocation, etc.). In one implementation, the aforementioned tuning includes adjusting the transmission power of each individual small cell in the CBRS network while adhering to the maximum limits mandated by SAS, taking into account load in terms of both (i) amount of traffic carried, and (ii) number of users served by each individual cell in the CBRS network. Based on this information, users from the MNO partner can be accepted, rejected at a given small cell within the CBRS network, and/or migrated to other cells).

Moreover, such tuning can include correlating QoS policies or requirements applied to individual services (e.g., uplink/downlink throughput) to subscriber profiles, such that subscribers receive services commensurate with their subscription plans and/or other requirements. Allocation of other resources within the MSO/MNO network based on the aforementioned user profiles may also be employed, such as e.g., where packet routing algorithms are implemented in order to minimize latency within (at least) the MSO portion of the network.

Methods—

Figure 5:
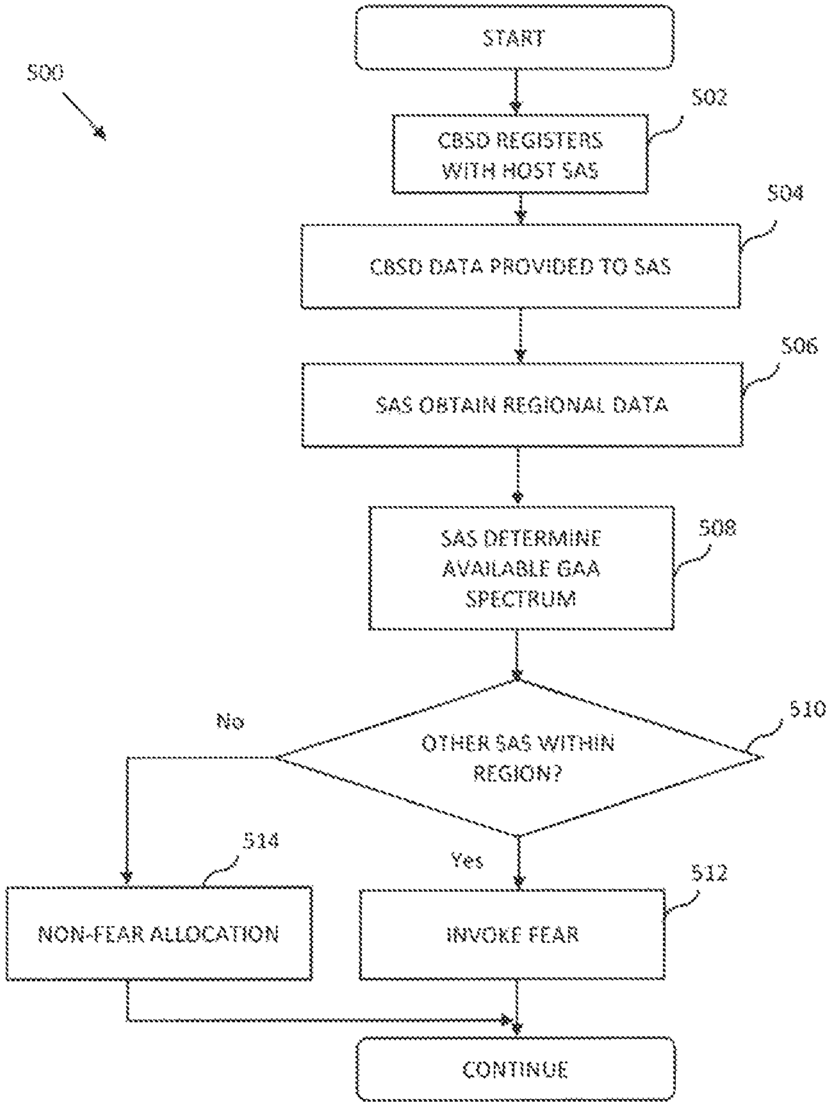
FIG. 5 is logical flow diagram of an exemplary generalized method for providing quasi-licensed band spectrum (e.g., CBRS GAA) allocations to multiple entities according to the present disclosure.
Figure 6:
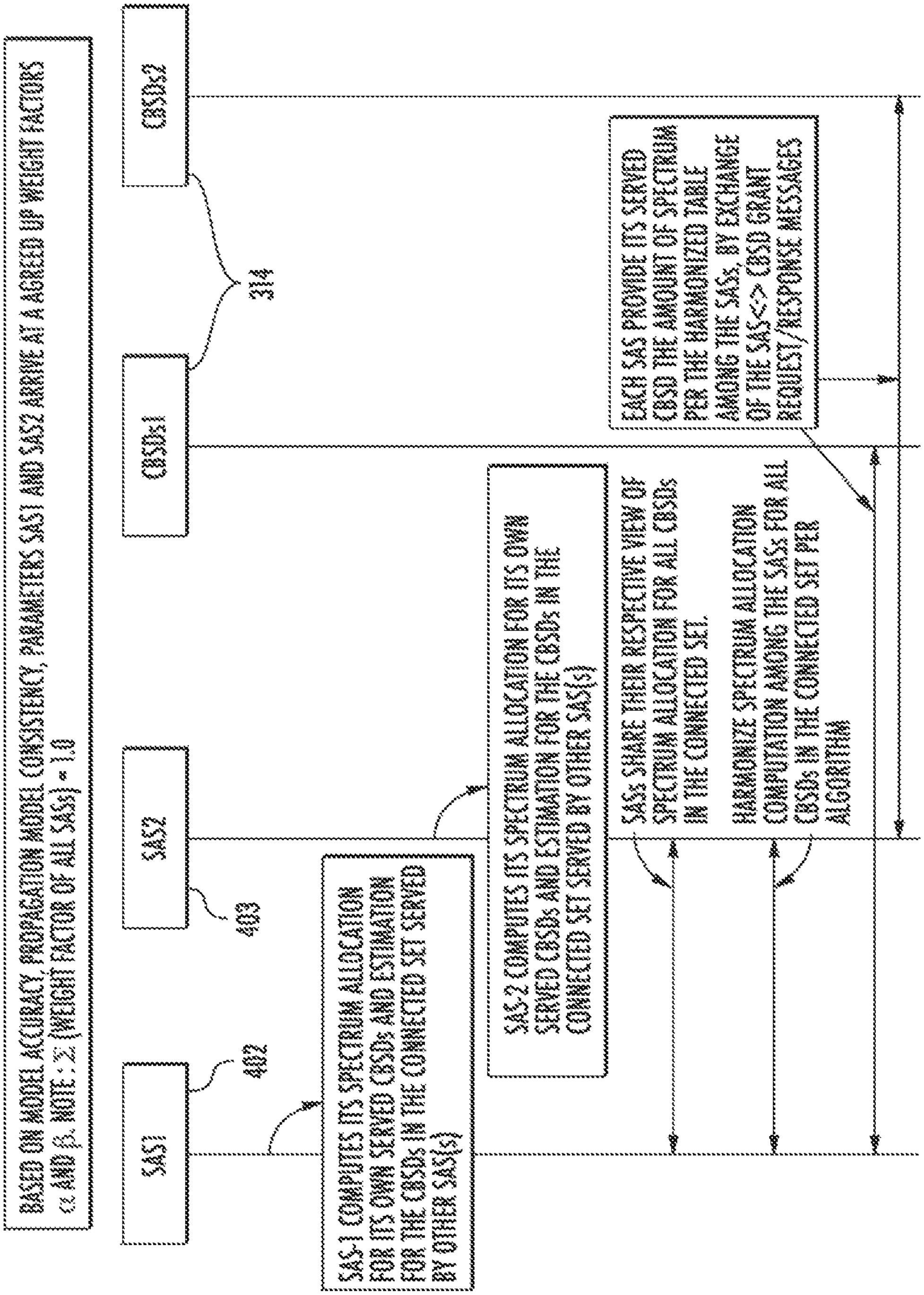
FIG. 6 is a ladder diagram illustrating an exemplary embodiment of a communication flow for establishing quasi-licensed band spectrum allocations in accordance with the methods of the present disclosure.
Figure 6A:
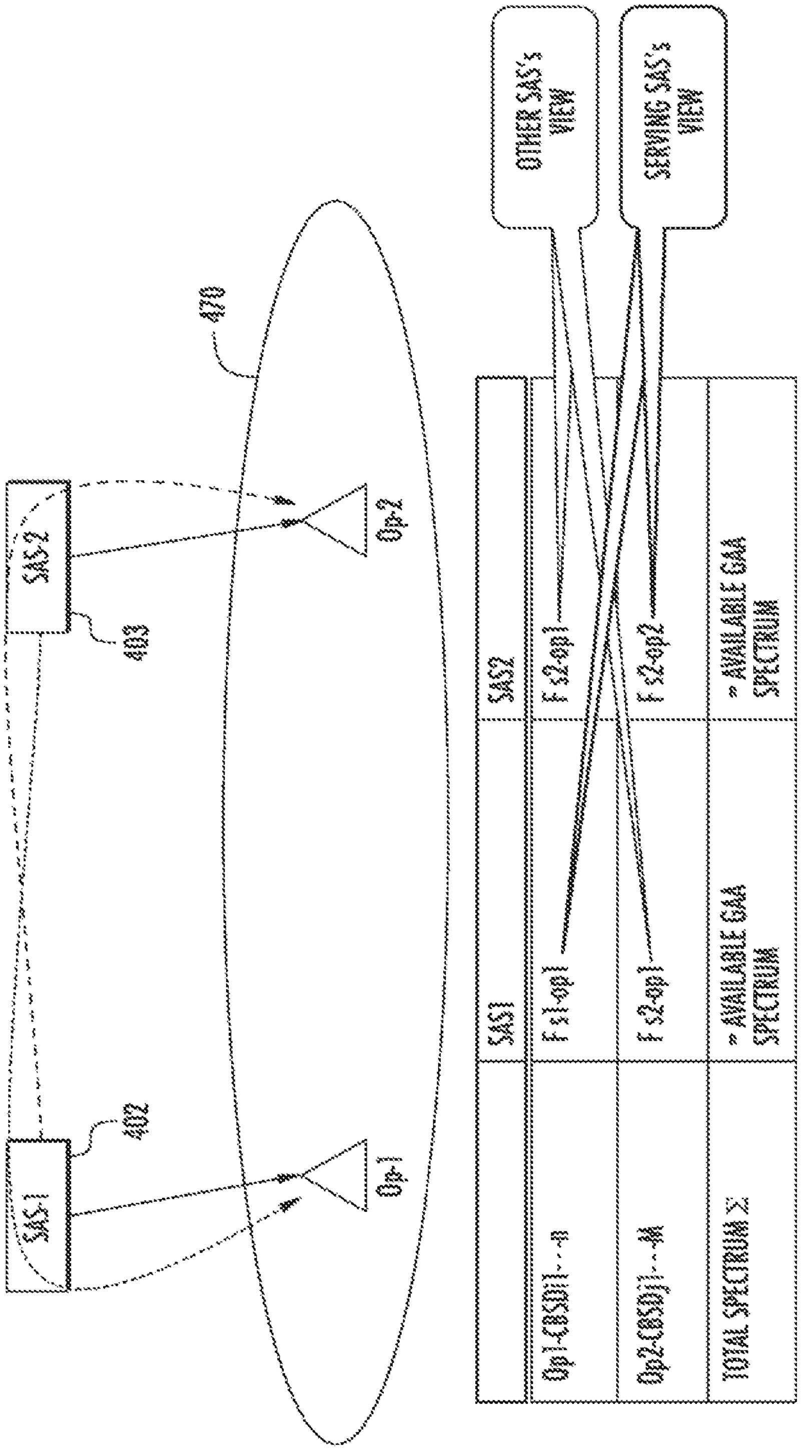
FIG. 6*a* graphically illustrates the calculation by each participating SAS entity associated with a service area and its constituent network operator(s) or NO(s) of spectrum allocations for itself and other participating SAS entities (and their NO(s)), according to one implementation of the disclosure.

Various methods and embodiments thereof for providing quasi-licensed (e.g., CBRS GAA) spectrum allocation according to the present disclosure are now described with respect to FIGS. 5-6*a*.

Referring now to FIG. 5, one embodiment of the general methodology of spectrum allocation according to the present disclosure is shown and described.

As illustrated in FIG. 5, the method 500 includes first registering one or more CBSDs 314 with a host SAS 402, 403 per step 502. As discussed above with respect to FIGS. 4*b*-1, the CBSD(s) may interface with the host SAS directly, or via one or more interposed entities such as computerized domain proxy (DP) entities 408. For the purposes of illustration, it will be assumed that each of the registering CBSDs is/are associated with a common network operator (NO) domain 444, although this is not a requirement for practicing the method 500.

Next, per step 504, relevant data relating to the CBSD(s) is provided to the host SAS. The CBSD data may include for example data relating to spatial location of each CBSD (e.g., location (lat/lon), height above sea level), antenna configuration and patterns used (e.g., MIMO, SISO, main lobe azimuth and elevation), as well as other parameters such as MCS (modulation and coding schemes available), CBSD backhaul capabilities, and yet other data.

Next, per step 506, the host SAS obtains data relating to regional components and aspects of its operation, including for example: (i) the presence/bandwidth of any known incumbents or PAL users within a given region. Presumably, the SAS already maintains data regarding its then-current geographic region of interest; however, if not, such data can be obtained from e.g., a parent or sibling SAS, or other entity, such as via a data query thereto.

Per step 508, the host SAS also obtains data relating to available unlicensed spectrum ostensibly applicable to the region of interest. For instance, in one variant, the host SAS receives data from a parent FSAS or other entity as to available e.g., GAA spectrum at that point in time. Such GAA data may include data relating to inception/expiration of the available spectrum; e.g., a temporal-frequency "map" of available GAA spectrum as a function of time. As will be appreciated by those of ordinary skill, the various methodologies and apparatus described herein may be readily adapted to operate relative to such time-frequency resource maps, e.g., such that the "fair and equitable" allocations of spectrum may vary as a function of time. This attribute is especially significant from the standpoint that the GAA environment may by highly dynamic in nature due to e.g., changes in available GAA spectrum, additions/removal of operating entities or networks, DoD or other incumbent activity which may change as a function of time, or even changes in electromagnetic propagation (e.g., fast-fading environment) and/or interfering sources.

Per step 510, the host SAS determines whether other SAS are operative within the designated region of interest. As noted with respect to FIGS. 4-4*a*-2 above, a given SAS may not have control of other SAS entities cognizant over operations within the portions of the region of interest. For example two SAS entities may be hosts or cognizant over separate NO domains. To the degree that these NO domains have any potential overlap of significance in users and RF signal propagation, one domain may interfere with another, and hence spectrum allocation is needed (at least with respect to those CBSDs of each domain which may conflict). To the degree that one or more SAS entities are operative within the same region (at least during the planned longevity of the then-present allocation), such SAS entities will need to participate within a Fair and Efficient Allocation Routine (FEAR) implemented by the system (step 512), as described in greater detail below. If no such other SAS entities are identified by the host SAS, then a non-FEAR approach can be utilized by the host SAS (i.e., it need not consider other SAS and their CBSDs in allocating the available GAA spectrum to its own NOs and their respective CBSDs.

It will be appreciated that the foregoing logic 500 of FIG. 5 may be utilized by the host SAS (in cooperation with other SAS entities, as described below), and/or one or more supervisory or controlling processes. Specifically, in one variant, the aforementioned controller entity is used to obtain inputs from the respective SAS entities involved in the FEAR, and conduct calculations for the entities accordingly. For instance, a higher-level FSAS may be equipped with the FEAR algorithms, whereby it can, at time of GAA spectrum allocation, query each participating SAS for its respective CBSD/NO data (see step 504), and execute at least a portion of FEAR to generate output. For instance, in one model, the initial proposed allocations of the respective SAS can be generated by the controller/supervisor process, after which point the individual SAS can communicate with one another directly to further iterate using the FEAR to converge on a final allocation between themselves. As such, the supervisory entity/controller can in effect "calibrate" the two or more participating SAS by setting boundaries for their respective initial proposed allocations, such that the convergence process is not unduly protracted, or skewed towards one SAS or another improperly. Certain rules may be maintained by the supervisory/controller process, based on e.g., over-arching incumbent or Priority user allocations, or business or operational considerations of the various NOs served by the supervisory process (and the participating SAS entities).

Alternatively, the individual participating SAS entities may be configured to "negotiate" within the FEAR process on their own behalf, such that each generates its own initial proposed allocations. This approach advantageously obviates the need for the supervisory process (and data communications between the supervisory process and SAS entities), and only requires inter-SAS data links for operation.

It will also be appreciated that two or more participating SAS may utilize the methodology of FIG. 5 in parallel; i.e., each obtain data on their respective NO/CBSD configurations, ascertain total available GAA spectrum, and determine the existence of the other SAS (and hence the need to execute the FEAR). For instance, in one such model, each SAS is configured to maintain current data on both its served NO/CBSD configuration and operation, and available GAA total spectrum, and upon occurrence of a prescribed event (e.g., loss or incipient loss of a portion of the available 150 MHz of GAA spectrum), institute the methodology of FIG. 5 in parallel with similarly situated SAS entities within the affected geographic region. In this fashion, a serialized or "chain" approach is obviated, thereby enabling more rapid convergence on the final spectrum allocation via the FEAR.

It is noted that within a given region of interest, (i) there may be multiple service providers' CBSDs deployed (e.g., one or more NOs for each SAS); (ii) each such NO may want to maximize its share of GAA spectrum (e.g., to avoid having to "throttle" or otherwise restrict service to its users/subscribers); and (iii) in the region of interest, different operators (e.g., NOs) may be working with one or more different SAS vendors, such that one SAS vendor serves multiple NOs, or conversely one NO is served by two or more different SAS vendors).

Hence, to ensure fairness in allocation, exemplary configurations of the present disclosure requires each SAS vendor, in addition to being aware of its own served CBSDs, must also maintain awareness of the CBSDs served by other SAS vendors (i.e., inter-SAS communication). As with individual NOs referenced above, each such SAS vendor may similarly try to favor the CBSDs/NOs served by itself (rather than a competing SAS provider in the same region); e.g., via over-allocation of available GAA spectrum to itself.

Figure 5A:
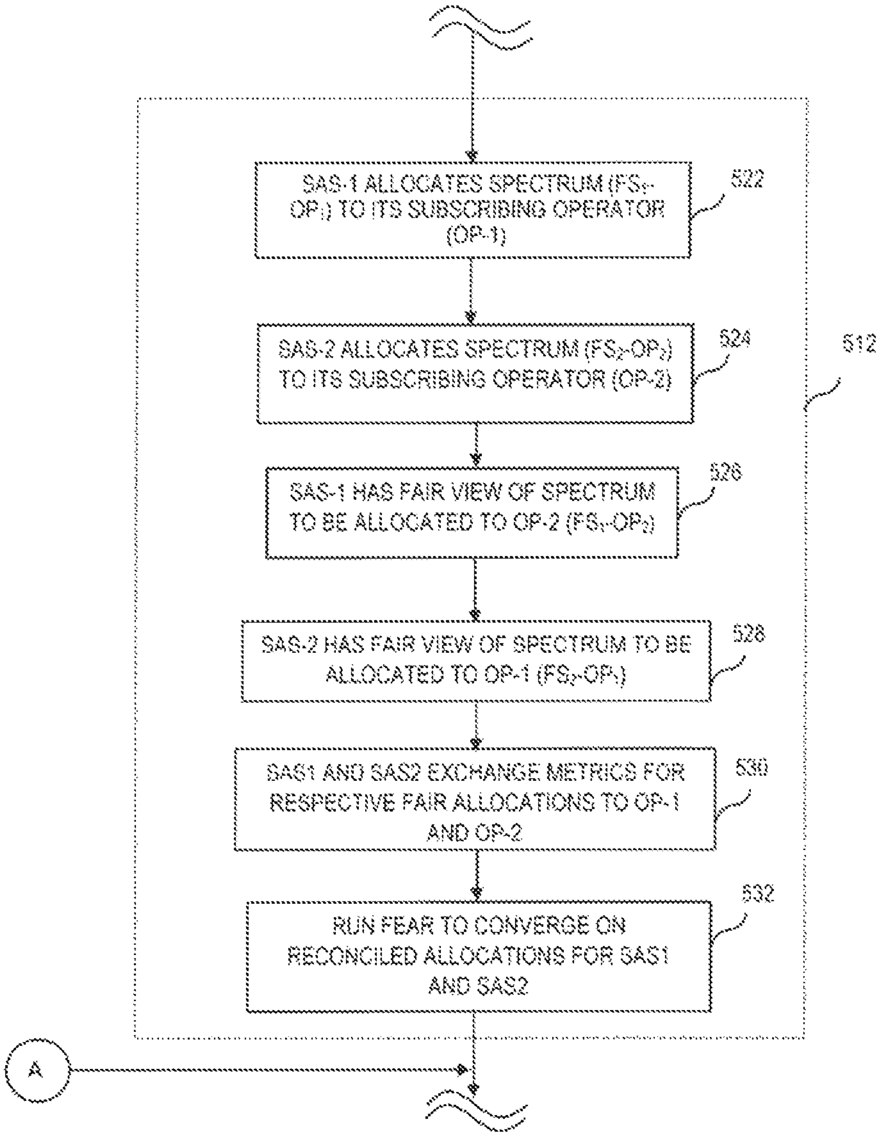
FIG. 5*a* is logical flow diagram of an exemplary implementation of a method for Fair and Equitable Allocation Routine (FEAR) processing according to the present disclosure; e.g., within the method of FIG. 5.
Figures 1, 5A:
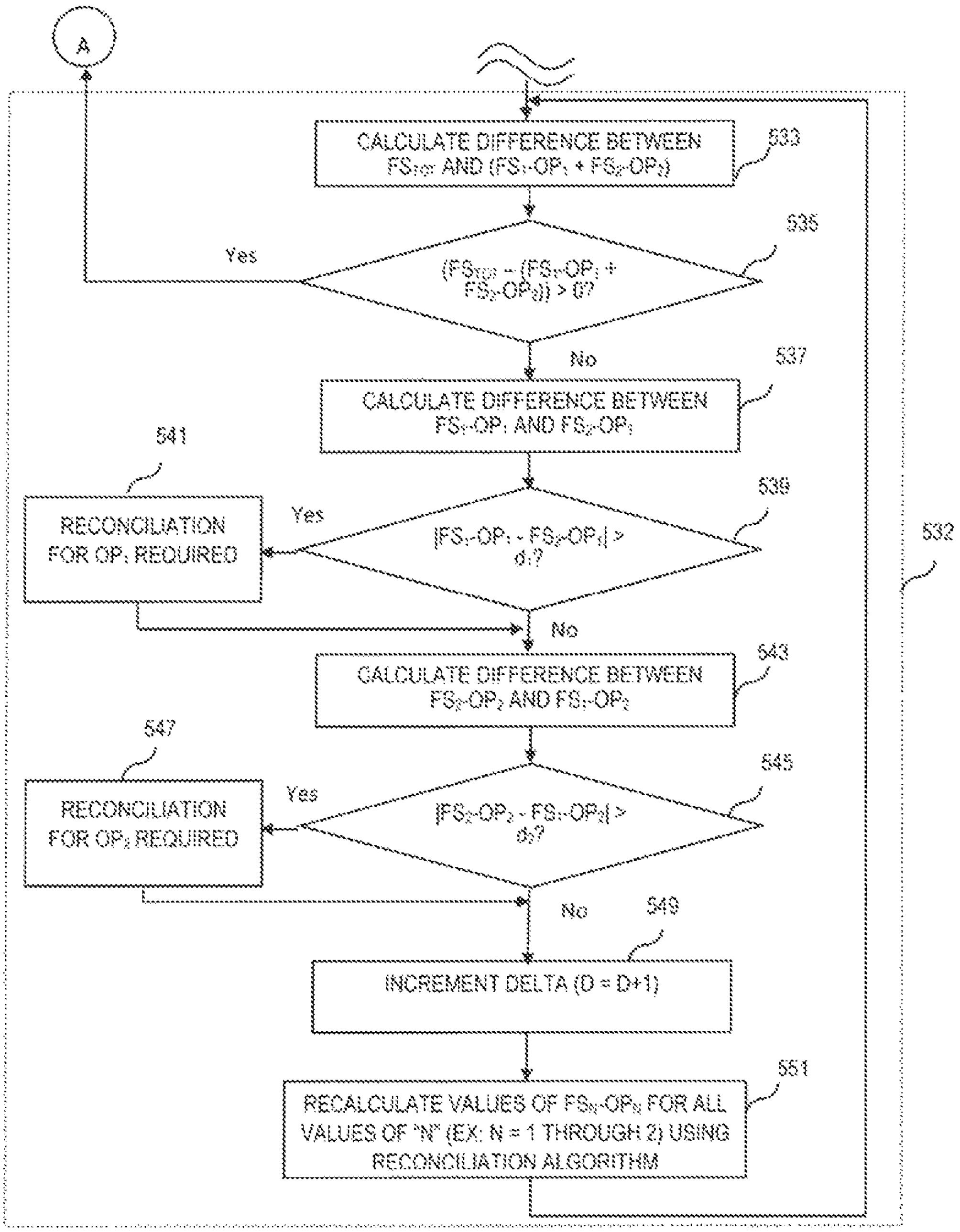
Figures 2, 5A:
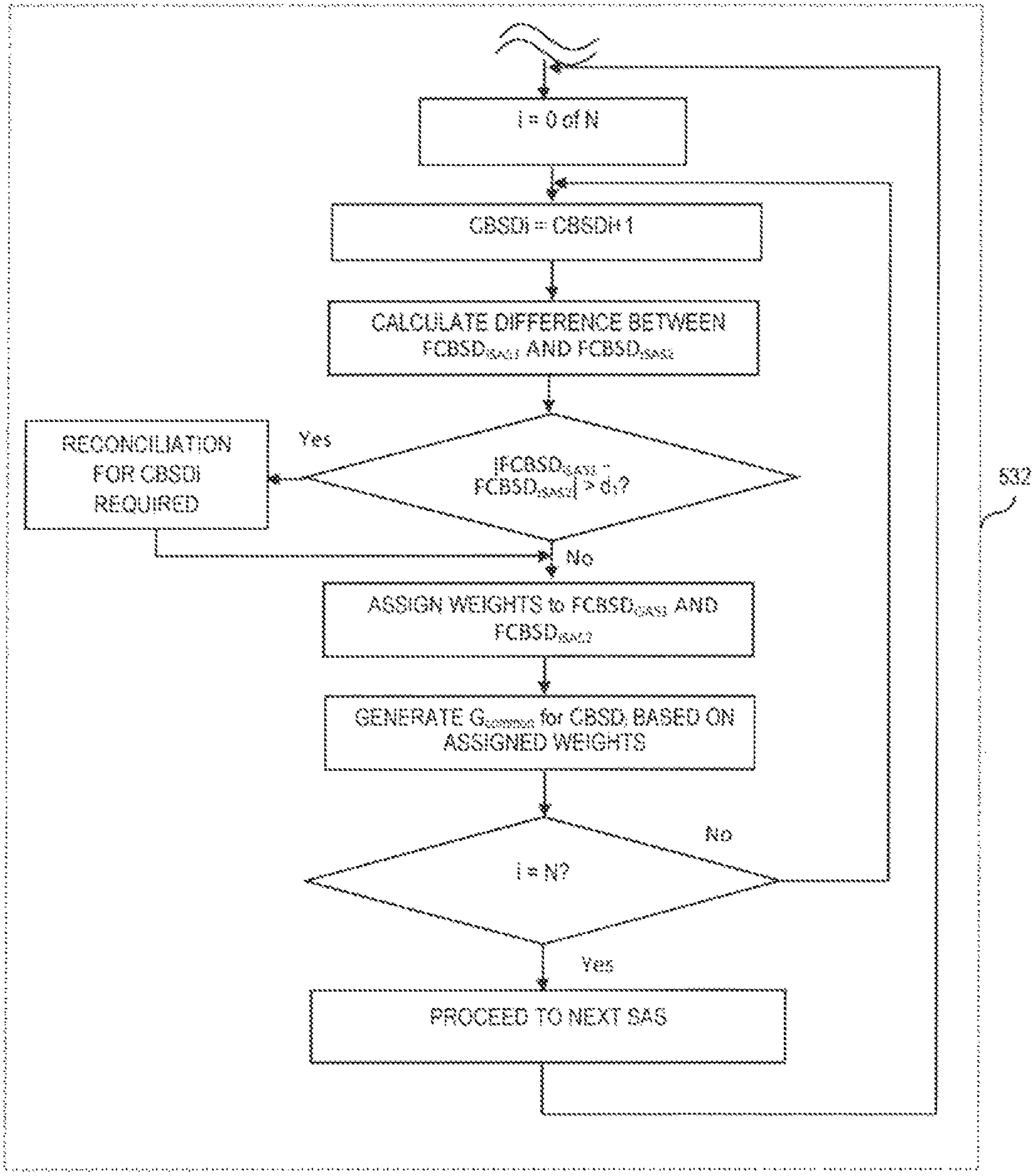

Referring now to FIG. 5*a*, one embodiment of the method of implementing a Fair and Equitable Allocation Routine (FEAR) according to the present disclosure is described (i.e., one approach for implementing step 512 of the method 500 of FIG. 5).

For purposes of clarity of illustration, the following discussion of FIG. 5*a* is cast in terms of two (2) participating SAS entities (SAS-1 and SAS-2), presumed to be associated with different SAS vendors. However, it will be appreciated by those of ordinary skill given the present disclosure that (i) a greater number of SAS entities may participate in the FEAR; and/or (ii) at least some portions/subroutines of the FEAR may be executed with a lesser number of SAS entities than the total number participating in the FEAR (e.g., certain portions of the routine may be performed between only two of say three total participating entities), such as on a "round robin" or other basis.

In the case of more than two entities, mathematical extension of the equations and algorithms described below can be used to ensure "fairness" between all SAS entities. For example, if three (3) SAS entities are participating in the allocation process, each SAS (or its processing proxy, as described below) can generate its own (internal) proposed allocation, as well as proposed allocations for the two other SAS entities, and the calculated data may be exchanged between each of the SAS entities, such that each has the data of the other two participating entities.

As shown in FIG. 5a, per step 522, a first SAS (SAS-1) or its designated processing proxy allocates spectrum ($FS_1$-$OP_1$) to its subscribing network operator OP-1. Likewise, per step 524, a second participating SAS/proxy (SAS-2) allocates spectrum ($FS_2$-$OP_2$) to its subscribing network operator OP-2.

Per step 526, SAS-1 also has a "fair view" of spectrum to be allocated to OP-2, and generates a proposal for such (i.e., $FS_1$-$OP_2$). As a brief aside, it is noted that each of the SAS operating in a given region might utilize different mathematical or other models, such as for computing different RF characteristics (e.g., propagation model). Each SAS may use the same CBSD characteristics such as antenna patterns, antenna tilt, RF Tx power, etc., but may arrive at a completely different outcome, such as e.g., the calculated coverage area, because of differences in model accuracy, as well as use of different assumptions such as terrain data, etc., within each SAS. Each SAS may accordingly consider its view and evaluation of given CBSD as accurate and fair from its perspective; however, the outcome may differ markedly across SASs, and what may appear to be a fair or accurate assessment of a given CBSD by one SAS may in fact be inaccurate or "unfair" when considered from the perspective of another SAS. This is especially true where the calculating SAS is not the serving SAS (as in the case of SAS-1 calculating its "fair view" proposal for OP-2, as in the case above), since the serving SAS generally will have better data regarding its own (served) CBSDs and infrastructure as compared to a participating but non-serving SAS.

Likewise, SAS-2 has fair view of spectrum to be allocated to OP-1, and generates its proposal for such ($FS_2$-$OP_1$) per step 528.

Thereafter (or concurrently), SAS-1 and SAS-2 exchange metrics regarding their respective views (proposals) of fair allocations for OP-1 and OP-2, per step 530, and per step 532, the FEAR (Fair and Equitable Allocation Routine) 431 is executed to converge on a reconciled or harmonized allocation across all participating SAS entities, as described in greater detail below with respect to the exemplary implementations or FIGS. 5a-1 and Referring now to FIG. 5a-1, one implementation of the exemplary FEAR process 532 of FIG. 5a is shown and described. Per step 533, the difference between $FS_{TOT}$ and ($FS_1$-$OP_1$+$FS_2$-$OP_2$) is first calculated.

Per step 535, the Routine determines whether the following condition is met:

$$(FS_{TOT}-(FS_1\text{-}OP_1+FS_2\text{-}OP_2))>0? \qquad \text{Eqn. (1)}$$

If so, then the proposed allocations all "fit" within the available GAA spectrum, and hence no further reconciliation or harmonization is required; no SAS or OP will be denied its (proposed) allocation, since there is adequate spectrum to cover all. This presumes that each SAS will at very least calculate its own needed spectrum (i.e., for its served NOs/CBSDs) aggressively such that it will not "self-inflict" a shortage of spectrum on itself. Hence, there is no need for each SAS to calculate a "fair view" proposal for other participating SASs, since each will in effect watch out for itself.

Note, however, that there may be a significant inequity or imbalance in the proposed allocation (for reasons described elsewhere herein) under the foregoing conditions, and hence the FEAR or other balancing routines may optionally be implemented if desired to more evenly balance such skewed proposed allocations.

Per step 537, the difference between $FS_1$-$OP_1$ and $FS_2$-$OP_1$ is calculated. Per step 539, the Routine determines whether the following condition is met:

$$|FS_1\text{-}OP_1\text{-}FS_2\text{-}OP_1|>d_1? \qquad \text{Eqn. (2)}$$

Stated differently, does the absolute value of the difference exceed a prescribed threshold value $d_1$ (where $d_1$ may be greater than or equal to zero—indicating that the proposed allocations between the "home" SAS and the "viewing" SAS are significantly divergent)? If so, then reconciliation for OP-1 is required (step 541), which will be addressed in the subsequent performance of the reconciliation algorithm (FIG. 5a-2). If not, then the difference between $FS_2$-$OP_2$ and $FS_1$-$OP_2$ is calculated per step 543.

Per step 539, the Routine determines whether the following condition is met:

$$|FS_2\text{-}OP_2\text{-}FS_1\text{-}OP_2|>d_2? \qquad \text{Eqn. (3)}$$

Similar to above, does the absolute value of the difference exceed a prescribed threshold value $d_2$ (indicating that the proposed allocations between the "home" SAS and the "viewing" SAS are significantly divergent)? If so, then reconciliation for OP-2 is required (step 547) which will be addressed in the subsequent performance of the reconciliation algorithm (discussed below).

If not, then the value of a variable factor or set of factors (Delta (D)) is incremented per step 549. As described in greater detail below, the value(s) of D may comprise for example any number of different allocation weights (such as individual weights for each SAS relative to the others participating in the reconciliation process), which may be incrementally varied on each iteration of the reconciliation processing, so as to enable convergence on allocations for each SAS (and each individual CBSD served thereby) which are equal to or less than the total available GAA spectrum allocated to the service region 470 under evaluation. D may also or alternatively include other factors as will be recognized by those of ordinary skill given the present disclosure.

One particular implementation of the reconciliation methodology according to the present disclosure is now described for purposes of illustration.

At a high level, under the reconciliation algorithm, all SAS entities/processing proxies in a given scenario will allocate certain amount of spectrum ($FS_i$-$CBSD_j$) to the CBSDs 314 served by the given SAS entity/proxy, where i is the index of the SAS, and j is the index of the CBSD under analysis. Note that this reconciliation occurs generally on a per-CBSD level in one embodiment.

Additionally, under the reconciliation model, each SAS entity/proxy will compute certain amounts of spectrum to the CBSDs served by other participating SAS entities within the harmonization process (e.g., SAS-1 and SAS-2 in the earlier two-SAS example).

For each such SAS, the sum total of the spectrum allocated to its own served CBSD and computed spectrum for the CBSD served by the other SAS(s), must (eventually) equal to the total available GAA spectrum.

Among the participating SASs, for the CBSDs where the computed and allocated spectrum are equal (i.e., where for a given CBSD, $FCBSD_{iSAS1}$=$FCBSS_{iSAS2}$ in the above example), there is no need for further reconciliation.

Conversely, for a given CBSD where there is a difference in the amount of spectrum allocated among the SASs, (i.e., $FCBSD_{iSAS1} \neq FCBS_{iSAS2}$), there is a need for reconciliation. In one implementation, the reconciliation process comprises assignment of pre-assigned weights given to each SAS's computational model based on pre-determined mutual agreement among the SASs; these weights are used to arrive at common spectrum allocations across all participating SASs. For example, in one variant, the variables α and β are mutually agreed-upon weights for SAS1 and SA2, respectively. In the exemplary embodiment, the values of α and β are based on: (i) model accuracy, (ii) radio frequency signal propagation models, and (iii) parameters used by SASs.

Per Eqn. (4), the sum of the values of all weights (here, two—α and β) must equal 1.0:

$$\alpha+\beta=1 \quad \text{Eqn. (4)}$$

Per Eqn. (5), the weights are applied to the "local" and "fair view" computations of spectrum, respectively, for a given CBSD (i.e., $CBSD_i$) in the two-SAS example above to generate a "common" value (G):

$$(\alpha^*FS_1\text{-}CBSD_i)+(\beta^*FS_2-CBSD_i)=(G_{common}\text{-}CBSD_i) \quad \text{Eqn. (5)}$$

This process can be repeated for all CBSDs (i.e., $CBSD_i$ where i=1 to N), for which the allocated spectrum reconciliation is needed, until all CBSDs for all participating SAS entities have been processed (see exemplary flow of FIG. 5*a*-2). For example, some CBSDs within a domain may not require reconciliation due to e.g., availability of frequency re-use as in FIG. 4*c*, and hence can be eliminated from the "pool" of CBSDs undergoing reconciliation (i.e., they can re-use spectrum that may be allocated to other CBSDs of other operators, since geographically there is no possibility of collision/interference).

Moreover, if needed, second iteration of the foregoing methodology can be performed, with variations in select parameters (D) as in FIG. 5*a*, e.g., with lower weight assigned to those participating SAS entities having less accurate data/proposal models, and higher weight to the more accurate SAS entities.

As noted above, in general, the foregoing weighting process can be extended to more than two SASs per Eqn. (6):

$$\alpha+\beta+\gamma+ \ldots +\zeta=1 \quad \text{Eqn. (6)}$$

As noted above, the values of α and β are in one implementation based on: (i) model accuracy, (ii) radio frequency signal propagation models, and (iii) parameters used by SASs. Specifically, as to (i), different SAS entities may have different capabilities or levels of accuracy with respect to inputs to the FEAR, such as where visibility into particular CBSD attributes may not be known for certain subsets of the CBSD population (e.g., due to the data not being readily available to the NO and hence the serving SAS). In such cases, the SAS or processing proxy may have to make an "educated guess" as to certain attributes of one or more CBSDs, thereby reducing the reliability of its computations (at least with respect to the CBSDs or portions of the network in question). Hence, such SAS may have their proposals de-emphasized relative to others.

Likewise, per (ii), the models used by the SAS (or inputs thereto) regarding RF signal propagation within the served service region or area may be limited, or simply not capable of a high degree of accuracy (such as e.g., where many architectural elements and topographical considerations, such as use of the CBSD within a city and having hills and mountains nearby, thereby creating a highly complex fast-fade/multipath environment which may be very difficult to model). Some CBSDs may also be able to provide actual signal strength or other related measurements (e.g., RSSI, RSRQ, etc.) to asses actual propagation characteristics, such as during a prior GAA allocation to that CBSD in the same frequency band, while others may not.

Similarly, per (iii), parameters used by the SAS in its network/CBSD characterization of demand or other factors may affect weighting. For instance, a given SAS may model network GAA spectrum demand using a model which has a high degree of variability, or which is inaccurate in some cases.

In another embodiment, the SAS entities (and or controller process, if used) may also be configured to speculatively generate (i) proposed GAA spectrum allocations for themselves or other SAS; and/or (ii) subsequent proposed allocations (i.e., further down within the FEAR execution regime), based on various speculated parameters such as network bandwidth demand (e.g., as a function of time or other conditions). In that demand for spectrum may be highly variable with time, and the calculation and allocation of spectrum somewhat latent (due to e.g., delays in proposal circulation, processing, reconciliation, allowing for intervening incumbent or PAL users, etc.), projections may be utilized consistent with the present disclosure, including having several "pre-canned" models or templates generated and stored within the MSO system (or each SAS/SAS vendor) by which allocation and subsequent NO operations may be made to adhere under certain circumstances.

For instance, in one variant, templates are calculated based on (i) a prescribed initial GAA allocation (presumed to be between 80 and 150 MHz), such as in increments of 10 MHz, and (ii) a known number of NOs (and presumed CBSDs thereof, based on most recent data supplied by the NOs to the SAS vendors). The foregoing templates may also be configured to take temporal variations into account (e.g., based on known variations in GAA available spectrum and/or NO demand for spectrum, as a function of time of day, day of the week, etc.).

FIG. 6 is a ladder diagram illustrating the exemplary communications flow for the methodology of FIG. 5, et seq.

FIG. 6*a* graphically illustrates the calculation by each participating SAS entity associated with the service area 470 and its constituent NO(s) of spectrum allocations for itself and other participating SAS entities (and their NO(s)).

CBRS Controller and FEAR Engine Server Apparatus—

Figure 7A:
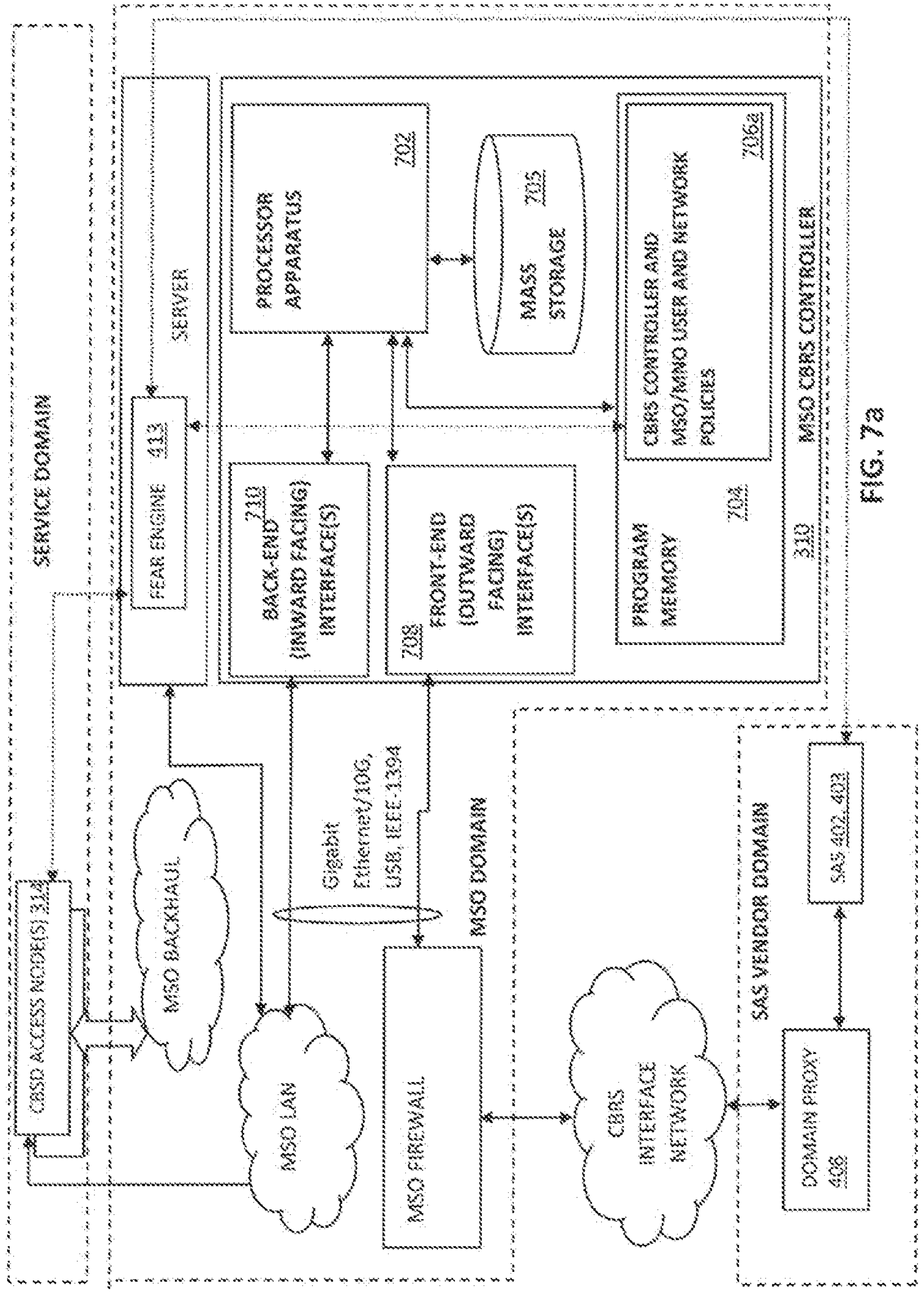
FIG. 7*a* is a functional block diagram illustrating a first exemplary embodiment of an MSO CBRS controller apparatus and internal (MSO domain) FEAR engine useful with various embodiments of the present disclosure.
Figure 7B:
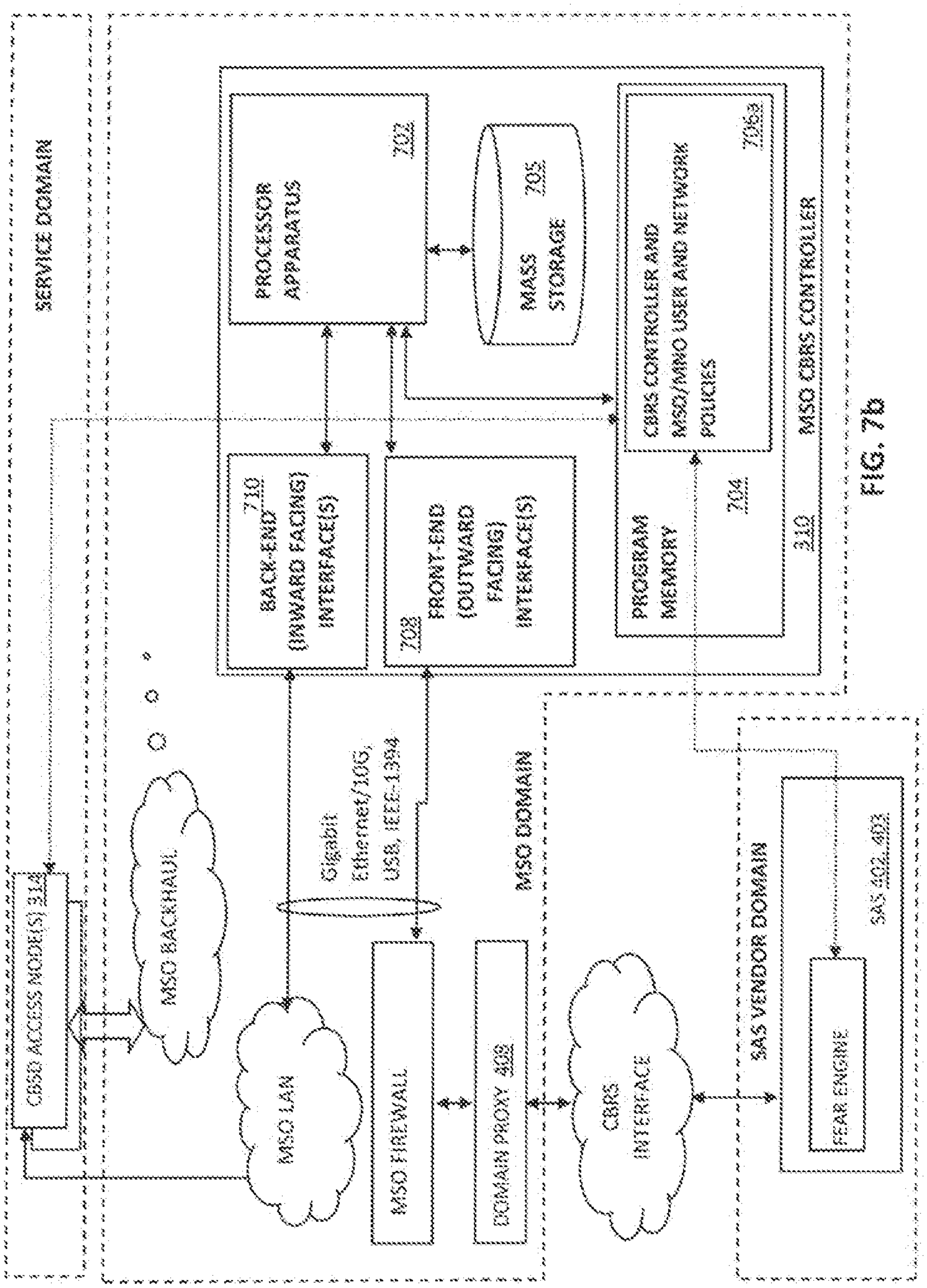
FIG. 7*b* is a functional block diagram illustrating a second exemplary embodiment of an MSO CBRS controller apparatus, communicative with an external FEAR engine, useful with various embodiments of the present disclosure.
Figure 7C:
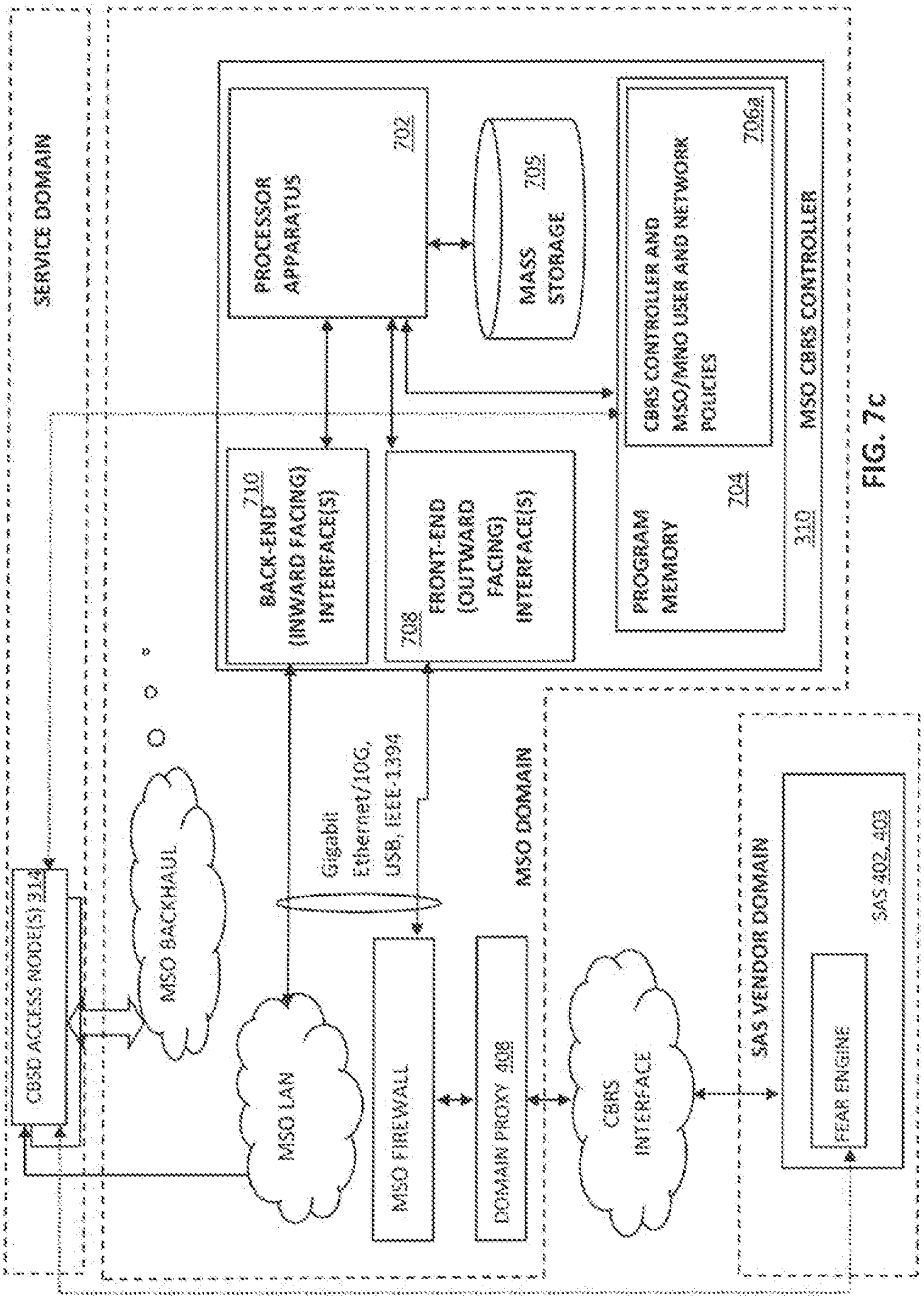
FIG. 7*c* is a functional block diagram illustrating a third exemplary embodiment of an MSO CBRS controller apparatus, wherein CBSDs of the NO (e.g., MSO) are directly communicative with an external FEAR engine.

FIGS. 7*a*-7*c* illustrates various exemplary configurations of exemplary hardware and software architecture of a controller apparatus, e.g., the CBRS controller 310 of FIG. 4*a*, as well as the FEAR engine 413, useful for operation in accordance with the present disclosure.

In one exemplary embodiment as shown in FIG. 7*a*, the controller 310 includes, inter alia, a processor apparatus or subsystem 702, a program memory module 704, a CBRS controller and manager module 706*a* (here implemented as software or firmware operative to execute on the processor 702), a back-end (inward-facing) network interface 710 for internal MSO communications and control data communication with the relevant CBSD(s) 314 and the FEAR engine server 413, and a front-end or outward-facing network interface 708 for communication with the DP 408 (and ultimately the FSAS/CSAS 402/403 via e.g., a secure interface network) via an MSO-maintained firewall or other security architecture. Since CBRS controllers could feasibly be employed for surreptitious activity, each should be secure from, inter alia, intrusive attacks or other such events originating from the public Internet/ISP network 311 (FIG. 3*a*) or other sources.

Accordingly, in one exemplary embodiment, the controllers 310 are each configured to utilize a non-public IP address within a CBRS "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet (and hence e.g., DPs 408 responding to MSO-initiated CBRS spectrum allocation requests or data exchanges), but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via a DP "spoof" or MI™ attack.

In addition, the controller 310 of the exemplary implementation is configured to only respond to a restricted set of protocol functions; i.e., authentication challenges from a valid DP 408 or SAS 402, 403 (i.e., those on a "white list" maintained by the MSO), requests for interference monitoring data from a DP or SAS, resource allocation ACKs, etc.

Although the exemplary controller 310 may be used as described within the present disclosure, those of ordinary skill in the related arts will readily appreciate, given the present disclosure, that the controller apparatus may be virtualized and/or distributed within other network or service domain entities, and hence the foregoing apparatus 310 is purely illustrative.

More particularly, the exemplary controller apparatus 310 can be physically located near or within the centralized operator network (e.g., MSO network); within or co-located with a CBSD; within an intermediate entity, e.g., within a data center, such as a WLAN AP controller); and/or within "cloud" entities or other portions of the infrastructure of which the rest of the wireless network (as discussed supra) is a part, whether owned/operated by the MSO or otherwise. In some embodiments, the CBRS controller 310 may be one of several controllers, each having equivalent effectiveness or different levels of use, e.g., within a hierarchy (e.g., the controller 310 may be under a "parent" controller that manages multiple slave or subordinate controllers, with each of the "slaves" for example being designated to control functions within their own respective venue(s)).

In one embodiment, the processor apparatus 702 may include one or more of a digital signal processor, microprocessor, field-programmable gate array, or plurality of processing components mounted on one or more substrates. The processor apparatus 702 may also comprise an internal cache memory. The processing subsystem is in communication with a program memory module or subsystem 704, where the latter may include memory which may comprise, e.g., SRAM, flash and/or SDRAM components. The memory module 704 may implement one or more of direct memory access (DMA) type hardware, so as to facilitate data accesses as is well known in the art. The memory module of the exemplary embodiment contains one or more computer-executable instructions that are executable by the processor apparatus 702. A mass storage device (e.g., HDD or SSD, or even NAND flash or the like) is also provided as shown.

The processor apparatus 702 is configured to execute at least one computer program stored in memory 704 (e.g., the logic of the CBRS controller in the form of software or firmware that implements the various controller functions described herein with respect to CBRS spectrum allocation, etc.). Other embodiments may implement such functionality within dedicated hardware, logic, and/or specialized co-processors (not shown).

In one embodiment, the CBRS controller/manager **706*a* is further configured to register known downstream devices (e.g., access nodes including CBSDs and WLAN APs), other backend devices, and centrally control the broader wireless network (and any constituent peer-to-peer sub-networks), as well as (ii) obtaining CBSD and other infrastructure configuration data; and (ii) reporting obtained configuration data to the FEAR engine 413 (or other cognizant processing entity which implements the allocation methodologies of FIGS. 5-6*a***.

Moreover, as described in U.S. Patent Application Ser. No. 15/785,286 entitled "METHODS AND APPARATUS FOR COORDINATED UTILIZATION OF QUASI-LICENSED WIRELESS SPECTRUM," issued as U.S. Pat. No. 10,340,976 on Jul. 2, 2019, previously incorporated herein, MSO and MNO network and user policies may implemented using the controller logic **706*a***. In one implementation, one or more primary factors is/are used as a basis to structure the optimization to maximize or optimize the primary factor(s). For example, if the goal at given instance is to push a larger amount of data (i.e., throughput) such as in the downlink direction (DL), the UEs or devices with better signaling may be chosen by the optimization logic to transact more data in an efficient manner (effectively "path of least resistance" logic). This can also be applied to for instance a higher subscriber service tier vs. a lower subscriber tier; the higher tier may be allocated available bandwidth (at least to a prescribed degree or value) before bandwidth is allocated to the lower tier, so as to ensure the user experience for the higher tier is sufficient. Alternatively, the goal may be more equitable distribution of resources (i.e., radio/backhaul/core resources) among different users, access networks, partners and/or different types of services (e.g., voice versus data, QoS versus non-QoS, etc.), logic to balance the resources across the different user, etc. may be employed. See, e.g., U.S. Pat. No. 9,730,143 to Gormley, et al. issued Aug. 8, 2017 and entitled "Method and apparatus for self organizing networks;" 9,591,491 to Tapia issued Mar. 7, 2017 entitled "Self-organizing wireless backhaul among cellular access points;" and 9,730,135 to Rahman issued Aug. 8, 2017, entitled "Radio access network resource configuration for groups of mobile devices," each of the foregoing incorporated herein by reference in its entirety, for exemplary SON implementations useful with various aspects of the present disclosure.

In one embodiment, the controller and manager process **706*a* accesses the mass storage 705 (or the CBRS DB 404) to retrieve stored data relating to e.g., CBSD configuration and capabilities. The data or information may relate to reports or configuration files as noted above. Such reports or files may be accessible by the controller/manager 706*a* and/or processor 702, as well as other network entities, e.g., wireless nodes such as the CBSDs 314**.

In other embodiments, application program interfaces (APIs) such as those included in an MSO-provided applications, installed with other proprietary software, or natively available on the controller apparatus 310 (e.g., as part of the computer program noted supra or exclusively internal to the controller/manager **706*a*) may also reside in the internal cache or other memory 704**. Such APIs may include common network protocols or programming languages configured to enable communication with other network entities as well as receipt and transmit signals that a receiving device (e.g., CBSD, WLAN AP, client device) may interpret.

Returning to the exemplary embodiment as shown in FIG. 7*a*, one or more network "front-end" or outward-facing interfaces 708 are utilized in the illustrated embodiment for communication with external (non-MSO) network entities, e.g., DPs 408, via, e.g., Ethernet or other wired and/or wireless data network protocols.

In the exemplary embodiment, one or more backend interfaces 710 are configured to transact one or more network address packets with other MSO networked devices, particularly backend apparatus such as the MSO-operated CBSDs 314 within the target service venue or area. Other MSO entities such as the MSO CMTS, Layer 3 switch, network monitoring center, AAA server, etc. may also be in communication with the controller 310 according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface(s) 710 operate(s) in signal communication with the backbone of the content delivery network (CDN), such as that of FIGS. 3-4*a*. These interfaces might comprise, for instance, GbE (Gigabit Ethernet) or other interfaces of suitable bandwidth capability.

It will also be appreciated that the two interfaces 708, 710 may be aggregated together and/or shared with other extant data interfaces, such as in cases where a controller function is virtualized within another component, such as an MSO network server performing that function.

Notably, in the configuration of FIG. 7*a*, the FEAR engine 413 is configured to operate on a server within the MSO domain, and communicate with external entities (such as one or more participating SAS entities 402, 403) such as to provide computations or data generated by execution of the FEAR in support of GAA spectrum allocation. For example, in one embodiment, the FEAR engine 413 obtains data from the one or more CBSDs 314 within the relevant service domain(s), and conducts calculation of $FS_1$-$OP_1$ and $FS_1$-$OP_2$ (see FIG. 5) based thereon, and further provides this data (via the interposed MSO domain components to the external SAS 402, 403 (via the DP 408 if used).

Likewise, to the degree that the FEAR engine 413 requires third-party data from outside the MSO domain to perform its GAA spectrum allocation computations, it may receive data from the external SAS/DP (e.g., within the SAS vendor domain as shown, which is in inter-process data communication with other SAS as shown in FIGS. 4*b*-1 and 4*b*-2), or yet another entity having such data. For example, upon exchange of metrics/data from one or more other participating SAS(s), the data from the other SAS(s) can be forwarded to the FEAR engine 413 within the MSO domain for computation of e.g., differences in proposed allocations, metrics/delta values, etc.

In the configuration of FIG. 7*b*, the FEAR engine 413 is disposed within the SAS vendor domain (as opposed to the MSO domain as in FIG. 7*a*). Logical communication of data regarding the served MSO domain (e.g., from its infrastructure including CBSDs within the MSO service domain) is gathered by the MSO controller/manager process 706*a*, and forwarded to the FEAR engine 413 via the interposed MSO domain and external components.

The present disclosure also contemplates the two or more participating SAS entities 402, 403 utilizing a "delegation" approach, such as where one or more SAS within the participating SAS "group" is designated as "processing SAS", and hence raw or partially pre-processed data is forwarded to the designated SAS to perform the computations necessary to support the FEAR allocation generation. For instance, it may be the case that each participating SAS does not have a complete FEAR engine suite or processing capability, is off-line or partially impeded, or other scenario which makes use of the designated SAS (aka "FEAR proxy") desirable. As such, each participating SAS entity may, upon delegation or designation of a FEAR proxy SAS, cause data from its own served infrastructure to be forwarded the FEAR proxy SAS to enable performance of the calculations and algorithmic iteration to convergence as described above (see FIG. 7*c*).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

It will also be appreciated that while many of the aspects described herein regarding spectrum allocation between two or more entities occur within the current 3.55 to 3.70 GHz band, these aspects may be readily adapted for use in other bands contemporaneously with the above listed band(s). For example, in one variant, spectral allocation methods described above may be cross-band, such that a given SAS/CBSD or set of SASs/CBSDs operating within two bands (e.g., 3.55 GHz to 3.700, and say 4.0 GHz to 4.2 GHz) can be evaluated under the foregoing FEAR approach with respect to both bands. This may include for instance generation of internal and "fair view" proposed allocations for each different entity (i) considering each different band separately (e.g., internal and fair view proposed allocations for 3.55-3.70 GHz, and a second set of proposed internal and fair view allocations for 4.0-4.2 GHz), and/or (ii) considering the different bands as a whole (e.g., one set of internal and fair view proposed allocations for 3.55-3.70 GHz and 4.0-4.2 GHz considered in effect as one aggregated band, regardless of whether contiguous in frequency or not).

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for providing allocation of at least a portion of a wireless spectrum, the computerized method comprising:
receiving data indicative of a first allocation, generated using a first network entity and a first computational model, of wireless spectrum to one or more base stations within a first wireless network;
receiving data indicative of a second allocation, generated using a second network entity and a second computational model, of wireless spectrum to the one or more base stations within the first wireless network;
identifying one or more differences between the first allocation and the second allocation; and
reconciling at least one of the identified one or more differences based at least on one or more weights assigned to each of the first computational model and the second computational model.

2. The computerized method of claim 1, further comprising:
receiving data indicative of a third allocation, generated using the first network entity and a third computational model, of wireless spectrum to one or more base stations within a second wireless network;
receiving data indicative of a fourth allocation, generated using a using the second network entity and a fourth computational model, of wireless spectrum to the one or more base stations within the second wireless network;
identifying one or more differences between the third and fourth allocations; and
reconciling at least one of the identified one or more differences based at least on one or more weights assigned to each of the third computational model and the fourth computational model.

3. The computerized method of claim 2, wherein:
the first and third computational models comprise a first same computational model;
the second and fourth computational models comprise a second same computational model; and
the first same computational model is different than the second same computational model.

4. The computerized method of claim 1, wherein the one or more weights assigned to each of the first and second computational models are based on at least an accuracy associated with the respective computational model.

5. The computerized method of claim 1, wherein:
the first network entity comprises a computerized spectrum allocation process associated with the first wireless network;
the second network entity comprises a computerized spectrum allocation process associated with the first wireless network; and
at least the acts of the receiving of the data indicative of the first allocation, the receiving of the data indicative of the second allocation, and the reconciling are performed by a computerized spectrum process associated with neither the first network entity nor the second network entity, but in data communication with each.

6. The computerized method of claim 1, wherein:
the first network entity comprises a first computerized spectrum allocation process associated with the first wireless network;
the second network entity comprises a second computerized spectrum allocation process associated with the first wireless network; and
at least the acts of the receiving of the data indicative of the first allocation, the receiving of the data indicative of a first the second allocation, and the reconciling are performed by one of the first computerized spectrum allocation process or the second computerized spectrum allocation process.

7. The computerized method of claim 1, further comprising:
determining that the identified one or more differences between the first allocation and the second allocation exceeds a prescribed threshold;
wherein the determining is a prerequisite for performing the reconciling.

8. Computer readable apparatus having a storage medium, the storage medium comprising at least one computer program having a plurality of instructions configured to, when executed on a digital processing apparatus of a computerized wireless network apparatus, cause the computerized wireless network apparatus to:
receive data indicative of a first allocation, generated using a first network entity and a first computational model, of wireless spectrum to one or more base stations within a first wireless network;
receive data indicative of a second allocation, generated using a second network entity and a second computational model, of wireless spectrum to the one or more base stations within the first wireless network;
identify one or more differences between the first allocation and the second allocation; and
cause reconciling at least one of the identified one or more differences, wherein the causation of the reconciling comprises exchanging, with the second network entity, metrics regarding respective proposed allocations, and executing a reconciliation routine to converge on a reconciled or harmonized allocation across the first and second network entities.

9. The computer readable apparatus of claim 8, wherein the reconciling is based at least on one or more weights assigned to each of the first computational model and the second computational model.

10. The computer readable apparatus of claim 8, wherein the reconciling of the at least one of the identified one or more differences comprises enablement of a convergence on final wireless spectrum allocations for each of the first wireless network and a second wireless network.

11. The computer readable apparatus of claim 10, wherein:
the first wireless network comprises a network infrastructure configured to use CBRS (Citizens Broadband Radio Service) spectrum via a plurality of 3GPP (Third Generation Partnership Project) compliant NodeB devices, and is operated by a first network operator;
the second wireless network comprises a network infrastructure configured to use CBRS spectrum via a plurality of 3GPP compliant NodeB devices, and is operated by a second network operator; and
the final wireless spectrum allocations each comprise CBRS GAA (General Authorized Access) spectrum allocations.

12. The computer readable apparatus of claim 10, wherein:
the first and second wireless networks are associated with respective first and second geographic areas; and
the final wireless spectrum allocations for each of the first and second wireless networks comprise allocations which collectively total all wireless spectrum within a prescribed spectrum band then-available for allocation within the first and second geographic areas.

13. The computer readable apparatus of claim 8, wherein:
the first wireless network is operated by a first network operator, and a second wireless network is operated by a second network operator different than the first network operator;
at least one of the first network operator and the second network operator comprise a cable MSO (multiple systems operator); and
the at least one of the first wireless network and the second wireless network comprises a plurality of base stations backhauled by a DOCSIS (data over cable service interface specification) compliant system utilizing at least a radio frequency portion of a hybrid fiber coaxial (HFC) network of the cable MSO.

14. The computer readable apparatus of claim 13, wherein the computerized wireless network apparatus comprises a computerized wireless network apparatus managed by the cable MSO.

15. The computer readable apparatus of claim 8, wherein the first allocation comprises a wireless spectrum allocation which is preferential to the first wireless network relative to a second wireless network, and the wireless spectrum allocation which is preferential to the first wireless network relative to the second wireless network comprises a wireless spectrum allocation which intentionally over-allocates spectrum for the first wireless network relative to one or more projected or estimated needs.

16. Computerized network apparatus, comprising:
digital processor apparatus;
a data interface in data communication with the digital processor apparatus; and
storage apparatus in data communication with the digital processor apparatus and comprising a storage medium having at least one computer program comprised of a plurality of instructions, the plurality of instructions configured to, when executed on the digital processor apparatus, cause the computerized network apparatus to:
receive data indicative of a first allocation, generated using a first network entity and a first computational model, of wireless spectrum to one or more base stations within a first wireless network;
receive data indicative of a second allocation, generated using a second network entity and a second computational model, of wireless spectrum to the one or more base stations within the first wireless network;
identify one or more differences between the first allocation and the second allocation;
determine that the identified one or more differences between the first allocation and the second allocation exceeds a prescribed threshold; and
based on the determination, cause reconciling at least one of the identified one or more differences.

17. The computerized network apparatus of claim 16, wherein the plurality of instructions are further configured to, when executed on the digital processor apparatus, cause the computerized network apparatus to:
determine that a reconciliation algorithm is required to reconcile the first allocation and the second allocation.

18. The computerized network apparatus of claim 17, wherein the determination that the reconciliation algorithm is required to reconcile the first allocation and the second allocation comprises a determination that the one or more differences between the first allocation and the second allocation exceeds a prescribed amount.

19. The computerized network apparatus of claim 17, wherein the causation of the reconciling of the at least one of the identified one or more differences comprises application of the reconciliation algorithm to at least one of the data indicative of the first allocation or the data indicative of the second allocation.

20. The computerized network apparatus of claim 16, wherein the received data indicative of the first allocation of the wireless spectrum to the one or more base stations within the first wireless network comprises data indicative of at least one of: (i) geographic or spatial location of each of the one or more base stations; (ii) antenna configuration of each of the one or more base stations; or (iii) MCS (modulation and coding scheme) of each of the one or more base stations.

* * * * *